(12) United States Patent
Wada

(10) Patent No.: US 7,982,970 B2
(45) Date of Patent: Jul. 19, 2011

(54) ZOOM LENS AND IMAGE PICKUP APPARATUS HAVING THE SAME

(75) Inventor: Ken Wada, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 12/535,054

(22) Filed: Aug. 4, 2009

(65) Prior Publication Data

US 2010/0046074 A1 Feb. 25, 2010

(30) Foreign Application Priority Data

Aug. 19, 2008 (JP) ................. 2008-210404

(51) Int. Cl.
*G02B 15/14* (2006.01)
*G02B 17/00* (2006.01)

(52) U.S. Cl. ........ 359/687; 359/676; 359/726; 359/737; 396/72; 348/240.99; 348/335

(58) Field of Classification Search .......... 359/676–679, 359/686, 687, 726–737; 396/72–88; 348/240.99–240.3, 335–369

See application file for complete search history.

(56) References Cited

U.S. PATENT DOCUMENTS

| 7,023,624 B2 | 4/2006 | Nanba |
| 2005/0046962 A1 | 3/2005 | Nanba |
| 2007/0014031 A1* | 1/2007 | Kohno et al. ................. 359/687 |
| 2009/0040624 A1* | 2/2009 | Shinohara ..................... 359/687 |

FOREIGN PATENT DOCUMENTS

| JP | 2007-292795 A | 11/2007 |
| JP | 2007-293051 A | 11/2007 |

* cited by examiner

*Primary Examiner* — Darryl J Collins

(74) *Attorney, Agent, or Firm* — Canon USA, Inc. IP Div

(57) ABSTRACT

A zoom lens includes a first lens unit having a positive refractive power, a second lens unit having a negative refractive power, a reflection member configured to bend an optical path, a third lens unit having a positive refractive power, and a fourth lens unit having a positive refractive power. In the zoom lens, two or more lens units of the first through the third lens unit move during zooming. In addition, in the zoom lens, the third lens unit includes a first lens sub-unit, and a second lens sub-unit configured to move in a direction having a component perpendicular to the optical axis to displace an image forming position.

15 Claims, 17 Drawing Sheets

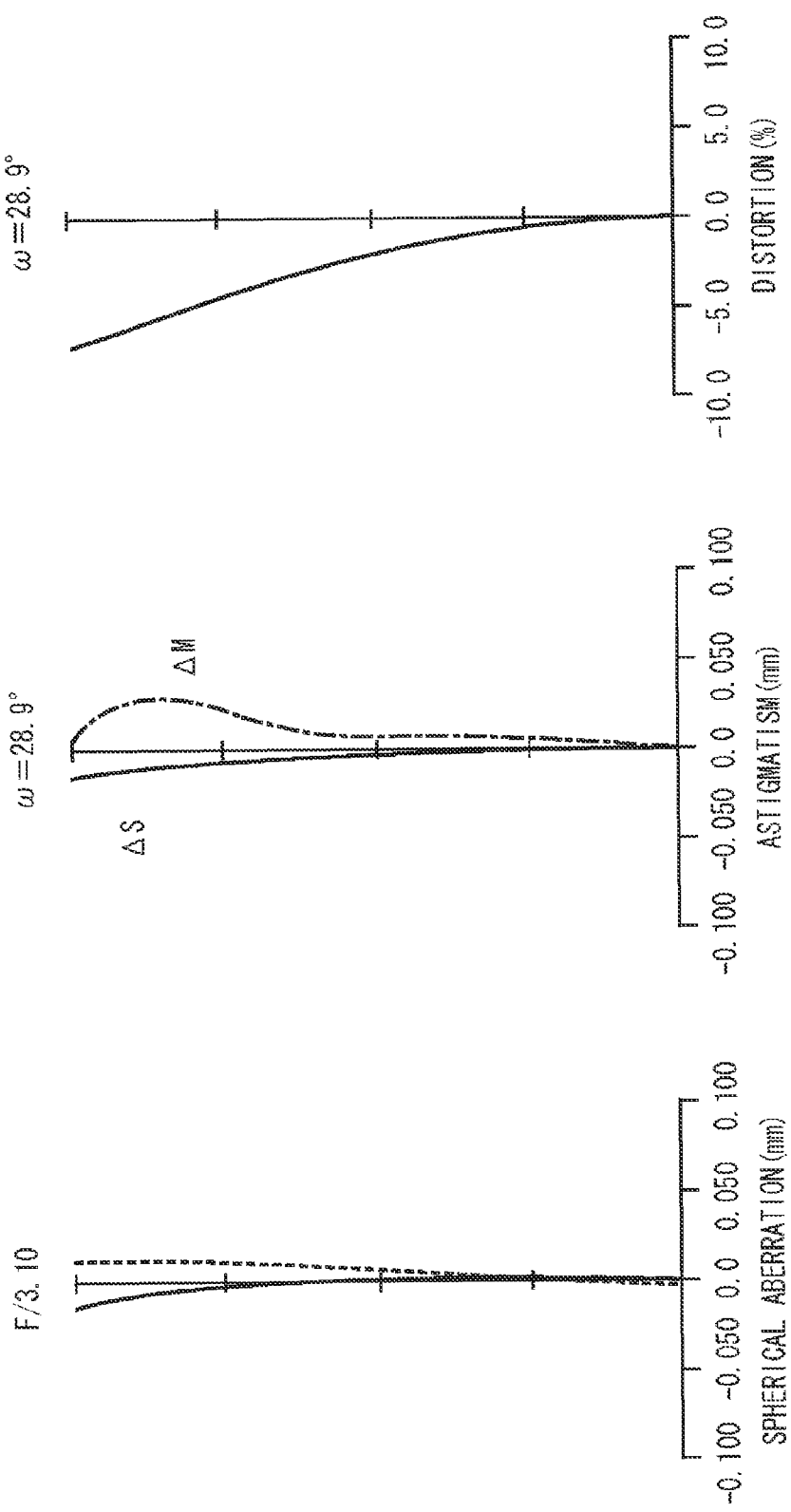

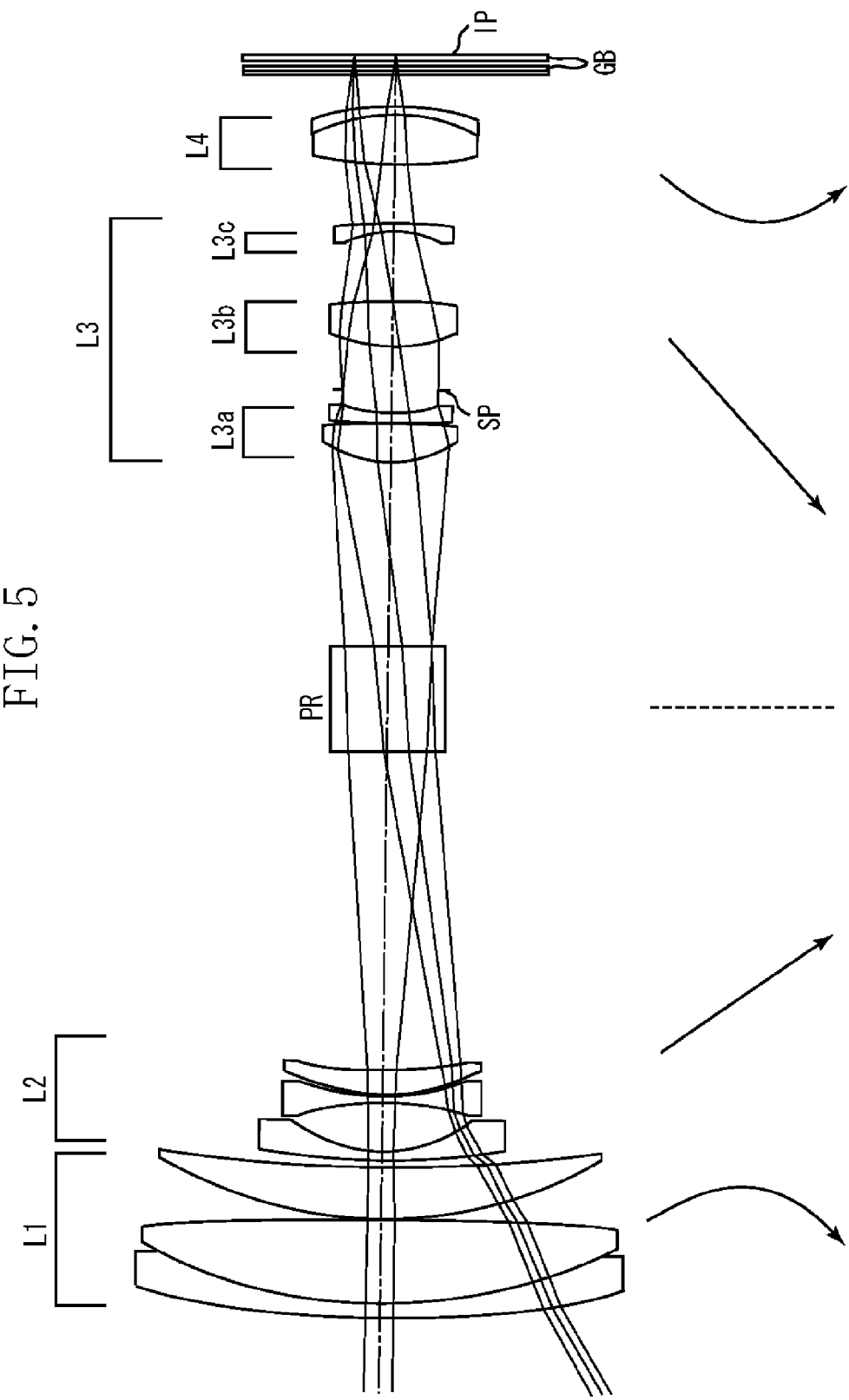

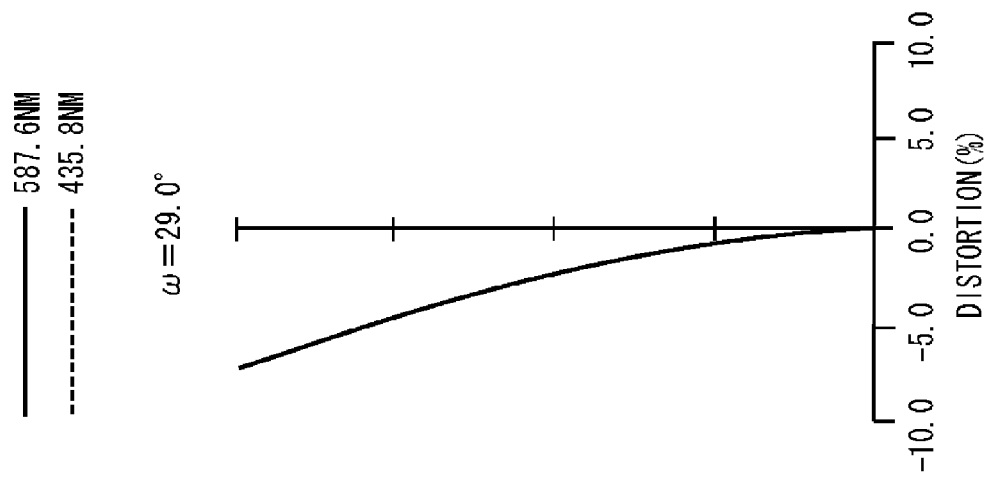
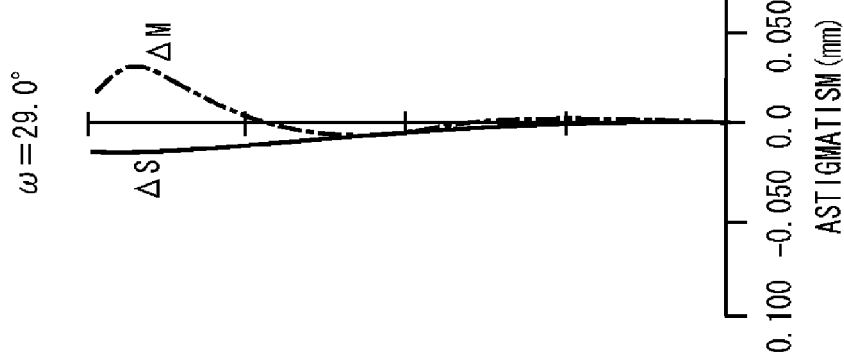
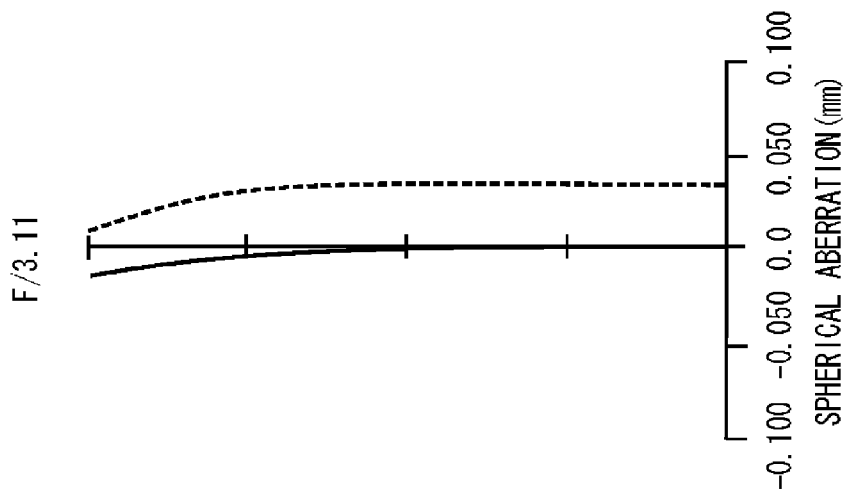
FIG. 10A

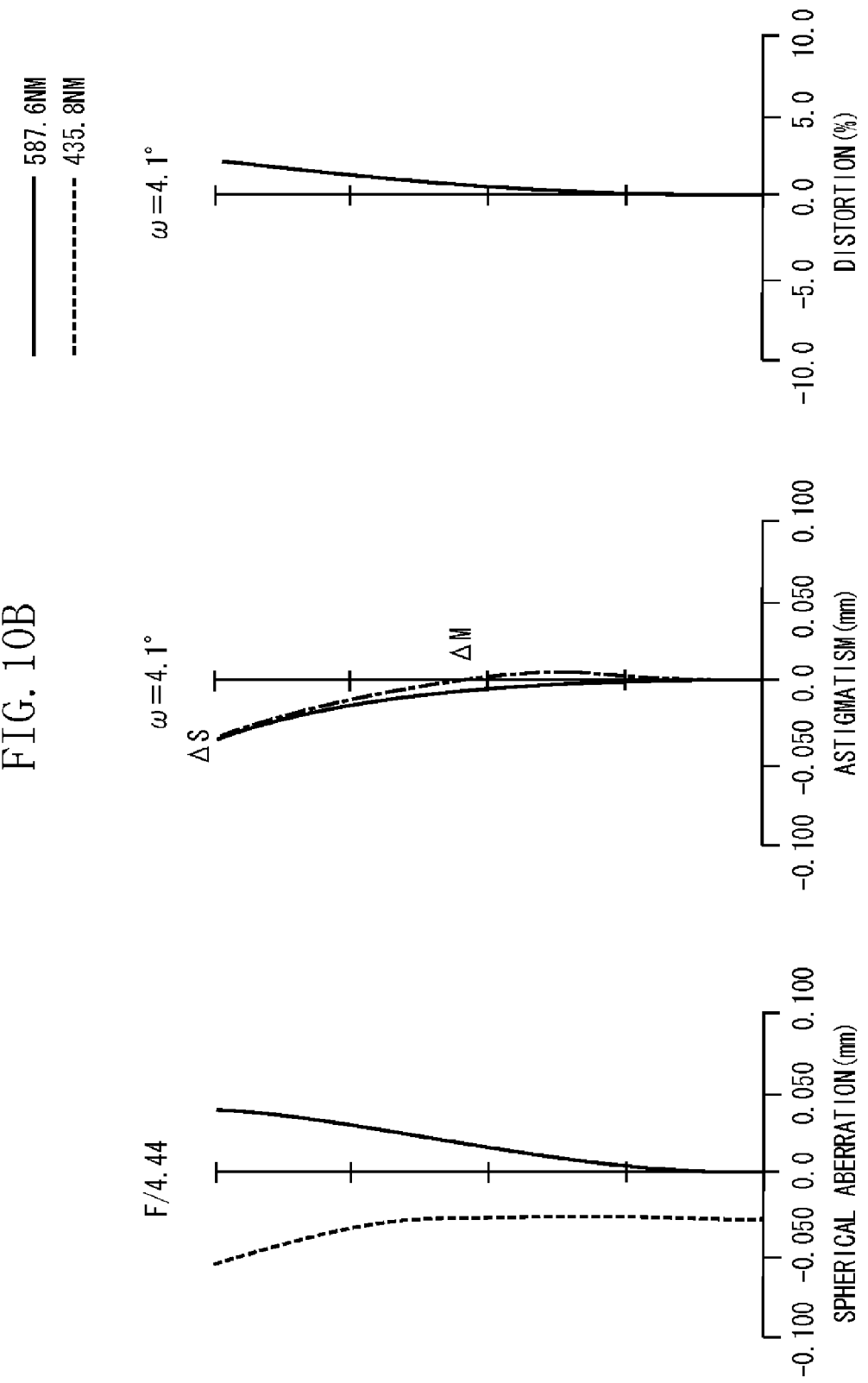

ZOOM LENS AND IMAGE PICKUP APPARATUS HAVING THE SAME

BACKGROUND OF THE INVENTION

1. Field of the Invention

The present invention relates to a zoom lens useful as a photographic optical system of an image pickup apparatus, such as a video camera, a digital still camera, a broadcast camera, or a silver-halide film camera.

2. Description of the Related Art

In recent years, an image pickup apparatus (camera) that uses a solid-state image sensor, such as a video camera or a digital still camera, has a large number of functions. Furthermore, the size of the entire apparatus is small at the same time. In addition, it is desired by the market that a photographic optical system used in such an image pickup apparatus has a high zoom ratio, is small in size, and is a zoom lens system having a relatively short total length (in the direction of front and back sides of the zoom lens system during shooting). If such a zoom lens is used, the thickness of a camera (the total front-to-back dimension of the camera during shooting) can be reduced.

Japanese Patent Application Laid-Open Nos. 2007-293051 and 2007-292795 each discuss a zoom lens having a reflection member (prism) for bending an optical path of a photographic optical system by 90 degrees in order to reduce the thickness of a camera.

When an operation for shooting an object is being performed, if vibration is applied to a zoom lens, then an image shake may occur. Accordingly, it is desired by the market that a zoom lens includes an image stabilization function for preventing or reducing an image shake. As such a zoom lens having an image stabilization function, a zoom lens has been used that corrects an image shake (hand shake) by moving a part of lens units constituting the zoom lens in a direction perpendicular to the optical axis. Hereinbelow, a "direction perpendicular to the optical axis" can also refer to a direction having a component perpendicular to the optical axis".

As one type of the zoom lenses described above, U.S. Pat. No. 7,023,624 discusses a zoom lens including, in order from the object side to the image side, a first lens unit having a positive refractive power, a second lens unit having a negative refractive power, a third lens unit having a positive refractive power, and a fourth lens unit having a positive refractive power and configured to correct an image shake by vibrating a part of lenses constituting the third lens unit in a direction perpendicular to the optical axis.

In the zoom lens discussed in Japanese Patent Application Laid-Open No. 2007-293051, in a five-unit zoom lens including, in order from the object side to the image side, a first lens unit having a positive refractive power, a second lens unit having a negative refractive power, a third lens unit having a positive refractive power, a fourth lens unit having a positive refractive power, and a fifth lens unit having a positive refractive power, a reflection member for bending the optical path is located on the image side of the second lens unit. Furthermore, the zoom lens discussed in Japanese Patent Application Laid-Open No. 2007-293051 executes zooming from the wide-angle end to the telephoto end by moving lens units so that the distance between the second and the third lens units becomes small. In addition, the zoom lens discussed in Japanese Patent Application Laid-Open No. 2007-293051 corrects an image shake by moving the entire third lens unit in a direction perpendicular to the optical axis.

In the zoom lens discussed in Japanese Patent Application Laid-Open No. 2007-292795, in a four-unit zoom lens including, in order from the object side to the image side, a first lens unit having a positive refractive power, a second lens unit having a negative refractive power, a third lens unit having a positive refractive power, and a fourth lens unit having a positive refractive power, a reflection member for bending the optical path is located in each of the first and the third lens units. In the zoom lens discussed in Japanese Patent Application Laid-Open No. 2007-292795, the first and the third lens units are stationary while the second and the fourth lens units are movable during zooming. In addition, the zoom lens discussed in Japanese Patent Application Laid-Open No. 2007-292795 divides the third lens unit into two partial lens units and corrects an image shake by moving the partial lens unit on the object side in a direction perpendicular to the optical axis.

The zoom lens discussed in U.S. Pat. No. 7,023,624 divides the third lens unit into a first lens sub-unit having a positive refractive power and a second lens sub-unit having a positive refractive power. Moreover, the zoom lens discussed in U.S. Pat. No. 7,023,624 corrects an image shake by moving the second lens sub-unit on the image side in a direction perpendicular to the optical axis.

However, unless an optical member for executing the image stabilization function and a reflection member for bending the optical path are located at appropriate positions within the optical system, it may become difficult to acquire a high-quality image while achieving a small camera thickness when applied to a camera.

The zoom lens discussed in Japanese Patent Application Laid-Open No. 2007-293051 corrects an image shake by displacing the entire third lens unit in a direction perpendicular to the optical axis. In the zoom lens discussed in Japanese Patent Application Laid-Open No. 2007-293051, the distance between the second and the third lens unit becomes smallest at the telephoto end, at which a large amount of image shake may occur. Accordingly, in the zoom lens discussed in Japanese Patent Application Laid-Open No. 2007-293051, lens barrels that support respective lens units may easily interfere with each other. This interference of the lens barrels may become further serious when the zoom lens has a high zoom ratio.

The zoom lens discussed in Japanese Patent Application Laid-Open No. 2007-292795 corrects an image shake by displacing a lens unit located close to the reflection member for bending the optical axis by 90 degrees in a direction perpendicular to the optical axis. Accordingly, lens barrels that support respective lens units may easily interfere with each other. In addition, it may become difficult to secure a sufficient amount of driving a correction lens unit for correcting an image shake.

In the zoom lens discussed in U.S. Pat. No. 7,023,624, no prism (reflection member) for bending the optical path is located on the optical axis. Accordingly, it becomes difficult to reduce the thickness of a camera. Furthermore, even if a prism is located within the optical system, it is difficult to achieve a high zoom ratio with the power arrangement discussed in U.S. Pat. No. 7,023,624.

SUMMARY OF THE INVENTION

According to an aspect of the present invention, a zoom lens includes, in order from an object side to an image side, a first lens unit having a positive refractive power, a second lens unit having a negative refractive power, a reflection member configured to bend an optical path, a third lens unit having a positive refractive power, and a fourth lens unit having a positive refractive power. In the zoom lens, during zooming from a wide-angle end to a telephoto end, two or more lens units among the first through the third lens units move and a distance between the second and the third lens units decreases. In addition, in the zoom lens, the third lens unit includes a first lens sub-unit, and a second lens sub-unit configured to move in a direction having a component perpendicular to an optical axis to displace an image forming position.

A zoom lens according to an exemplary embodiment of the present invention can reduce the thickness of a camera, increase an amount of driving an image shake correction lens unit during an image shake correction operation, and easily achieve a high-quality image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 2A and 2B are aberration charts of the first exemplary embodiment of the present invention.

FIG. 5 illustrates a lens cross section along a developed optical path according to a third exemplary embodiment of the present invention.

FIGS. 10A and 10B are aberration charts of the fifth exemplary embodiment of the present invention.

DETAILED DESCRIPTION OF THE EMBODIMENTS

Figure 1:
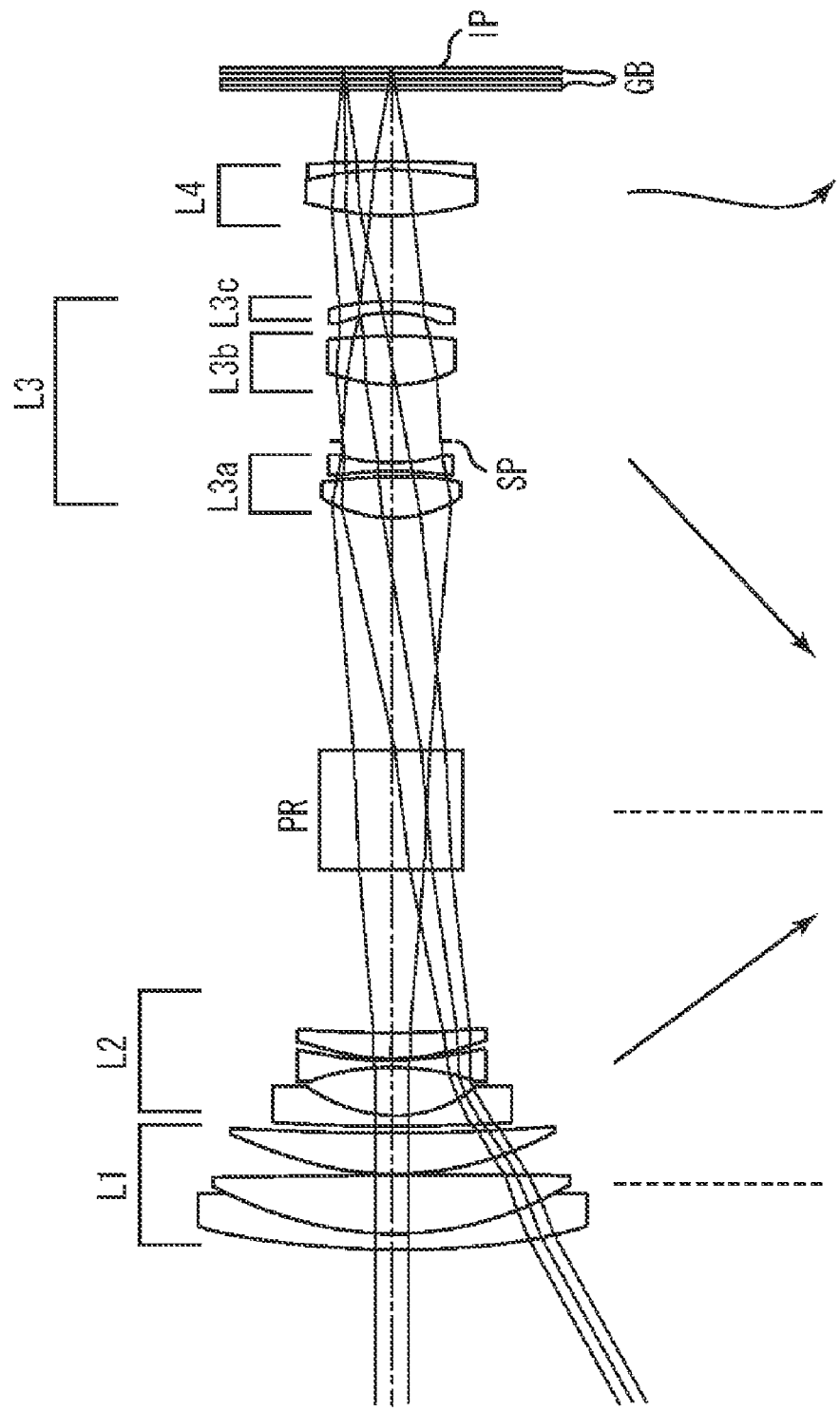
FIG. 1 illustrates a lens cross section along a developed optical path according to a first exemplary embodiment of the present invention.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Herein when referring to correcting or corrections of an error (e.g., aberration), a reduction of the error and/or a correction of the error is intended.

A zoom lens according to an exemplary embodiment of the present invention includes, in order from the object side to the image side, a first lens unit having a positive refractive power, a second lens unit having a negative refractive power, a reflection member including a prism having a reflection surface for bending an optical path, a third lens unit having a positive refractive power, and a fourth lens unit having a positive refractive power. A fifth lens unit having a positive refractive power can be provided on the image side of the fourth lens unit.

During zooming from the wide-angle end to the telephoto end, the reflection member is stationary while two or more lens units among the first through the third lens units move. The two or more lens units move so that the distance between the second and the third lens units decreases.

The third lens unit includes a first lens sub-unit having a positive or a negative refractive power and a second lens sub-unit having a positive refractive power and configured to move in a direction having a component perpendicular to an optical axis to displace an image forming position. It is also useful if the third lens unit includes a third lens sub-unit having a positive or a negative refractive power on the image side of the second lens sub-unit.

Figure 2B:
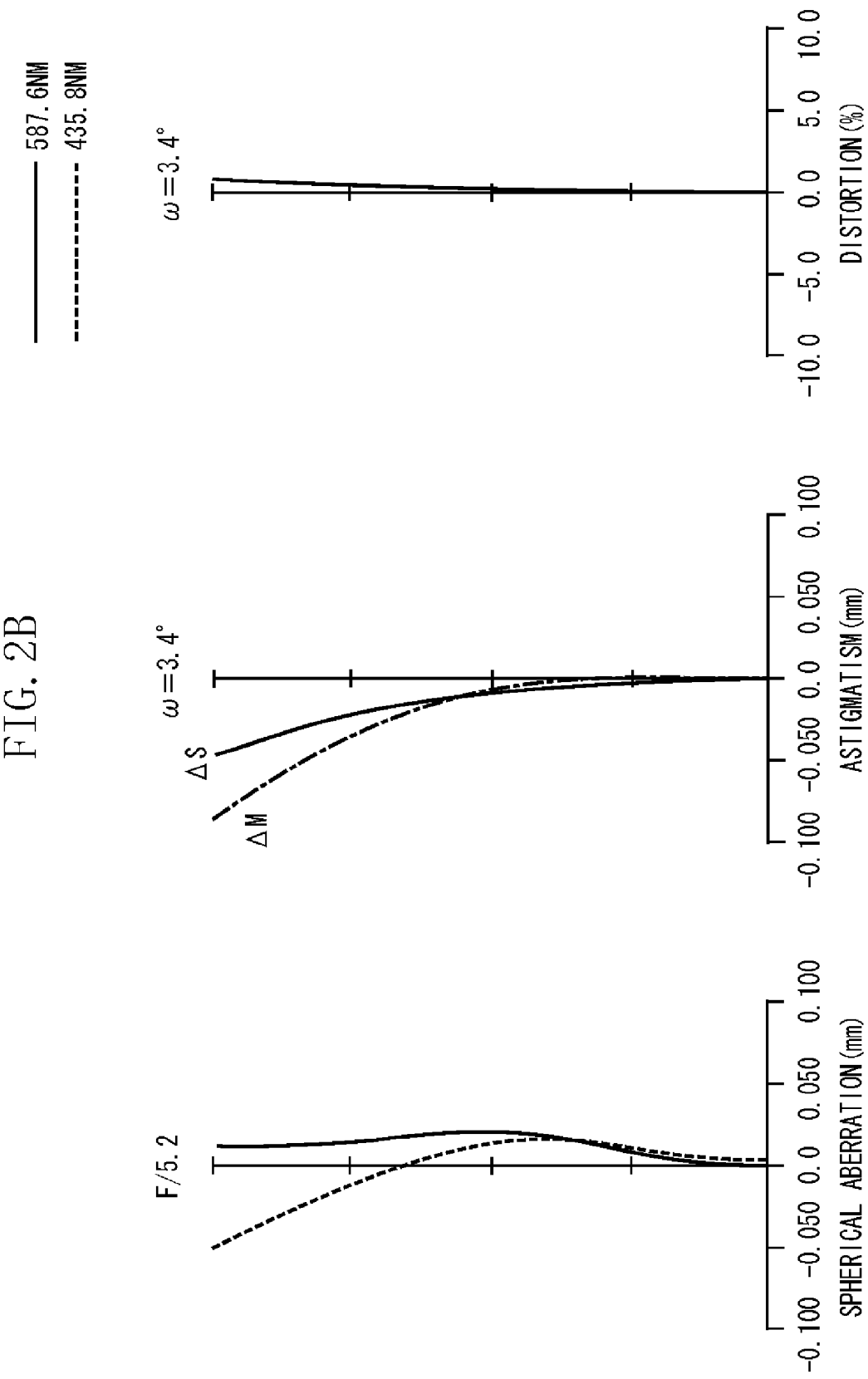

FIG. 1 illustrates a lens cross section along a developed optical path of a zoom lens according to a first exemplary embodiment of the present invention at the wide-angle end (short focal length end). FIG. 2A is an aberration chart of the zoom lens according to the first exemplary embodiment at the wide-angle end. FIG. 2B is an aberration chart of the zoom lens according to the first exemplary embodiment at the telephoto end.

Figure 3:
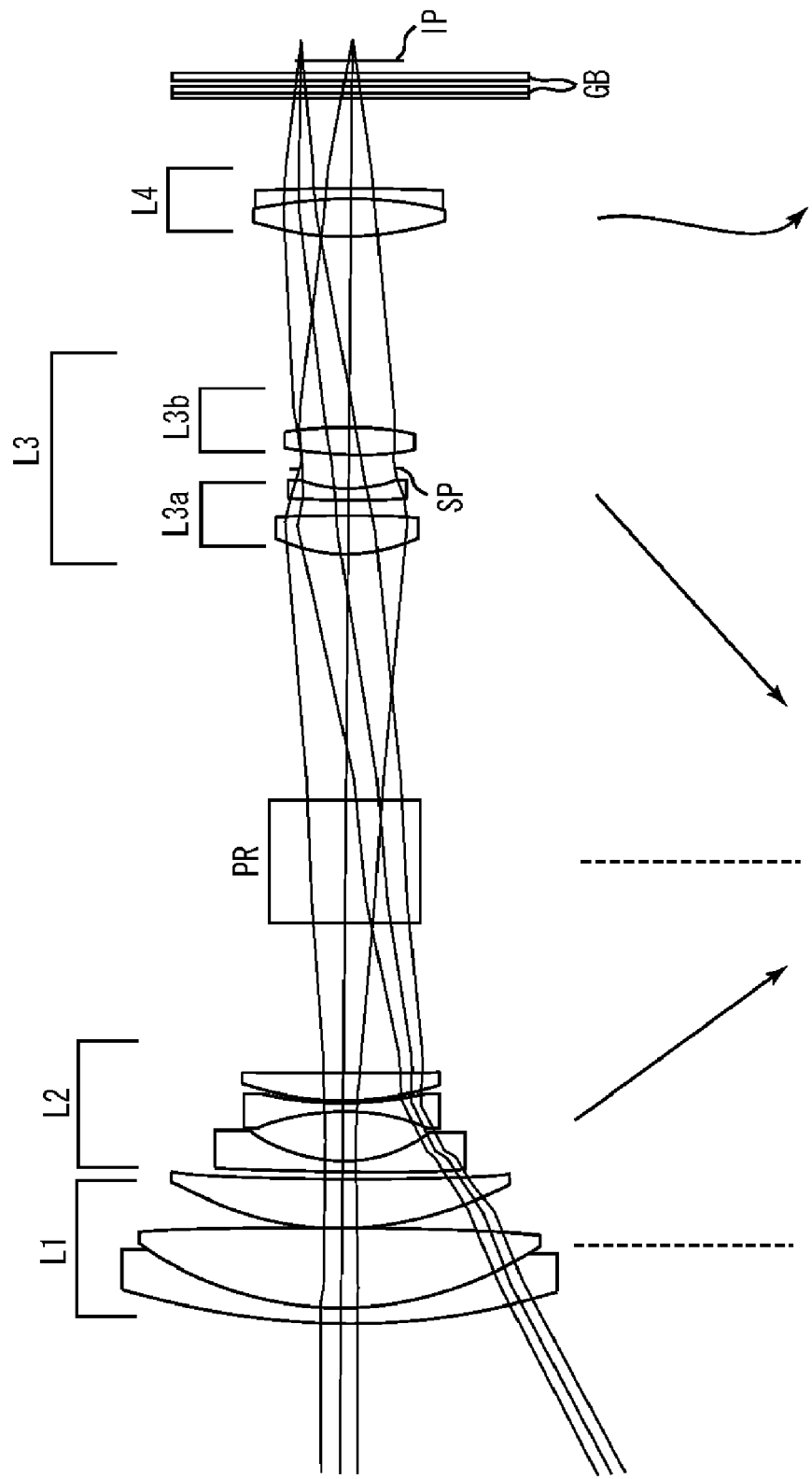
FIG. 3 illustrates a lens cross section along a developed optical path according to a second exemplary embodiment of the present invention.
Figure 4A:
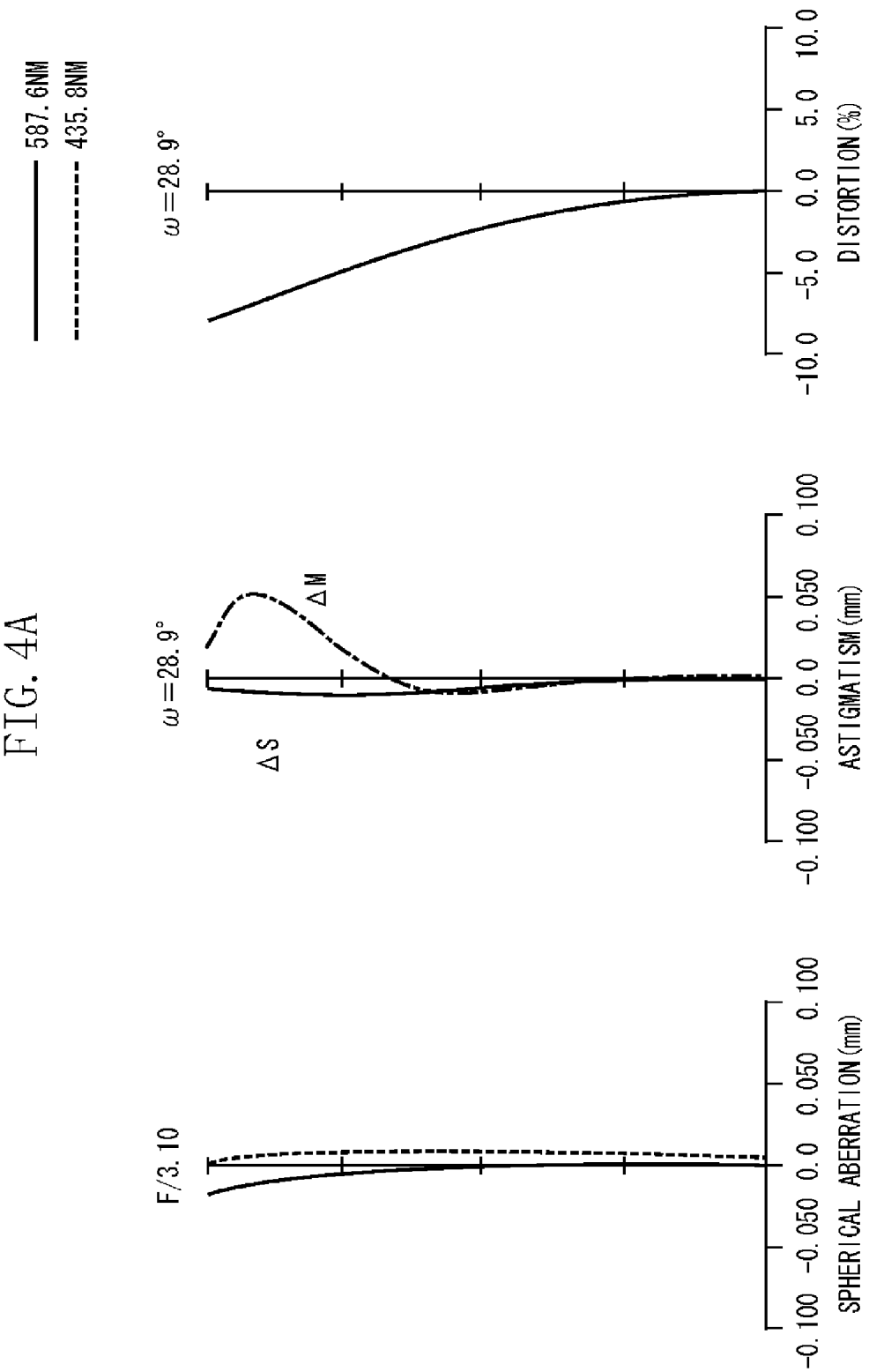
FIGS. 4A and 4B are aberration charts of the second exemplary embodiment of the present invention.
Figure 4B:
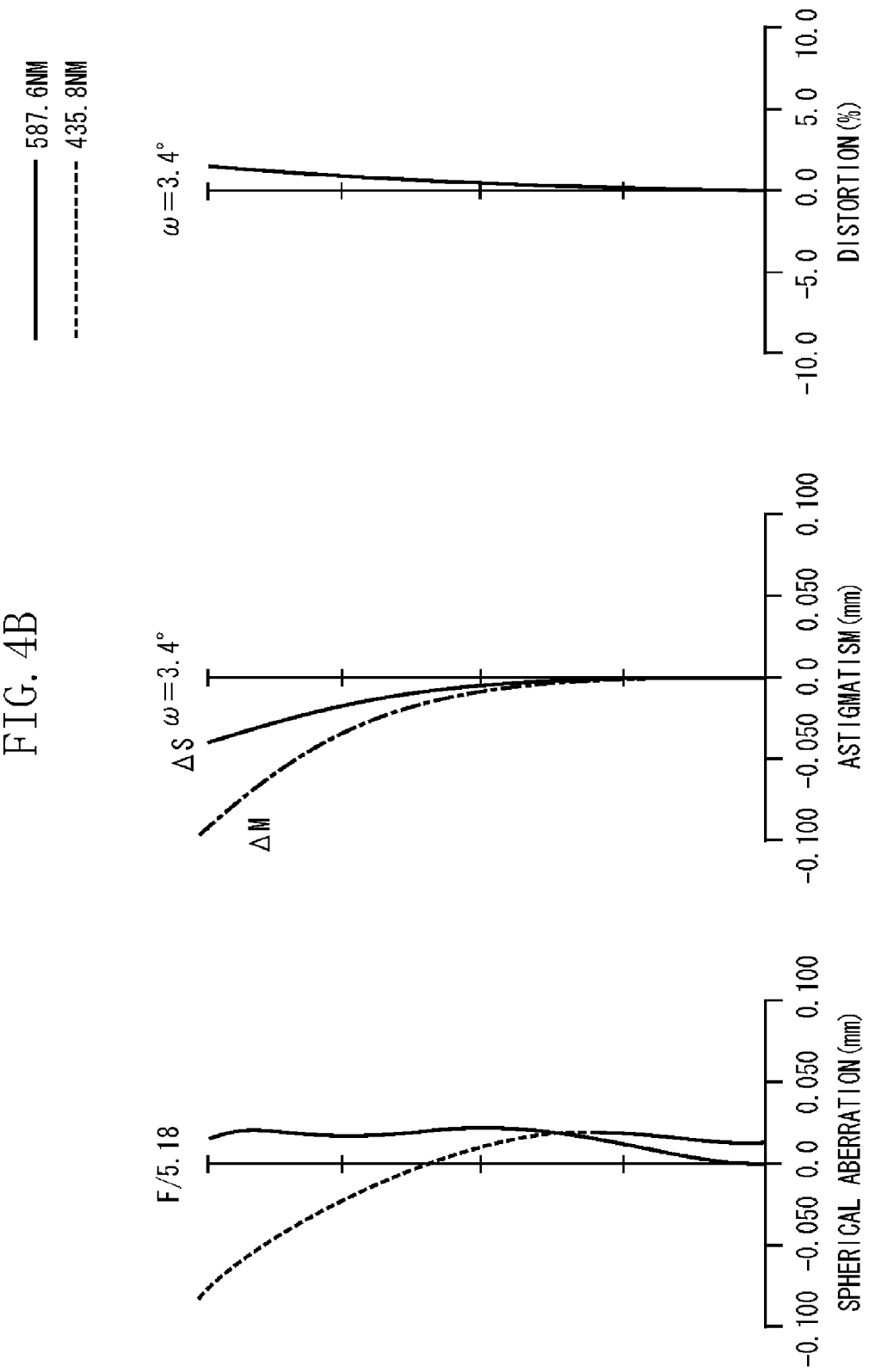

FIG. 3 illustrates a lens cross section along a developed optical path of the zoom lens at the wide-angle end according to a second exemplary embodiment of the present invention. FIG. 4A is an aberration chart of the zoom lens according to the second exemplary embodiment at the wide-angle end. FIG. 4B is an aberration chart of the zoom lens according to the second exemplary embodiment at the telephoto end.

Figure 6A:
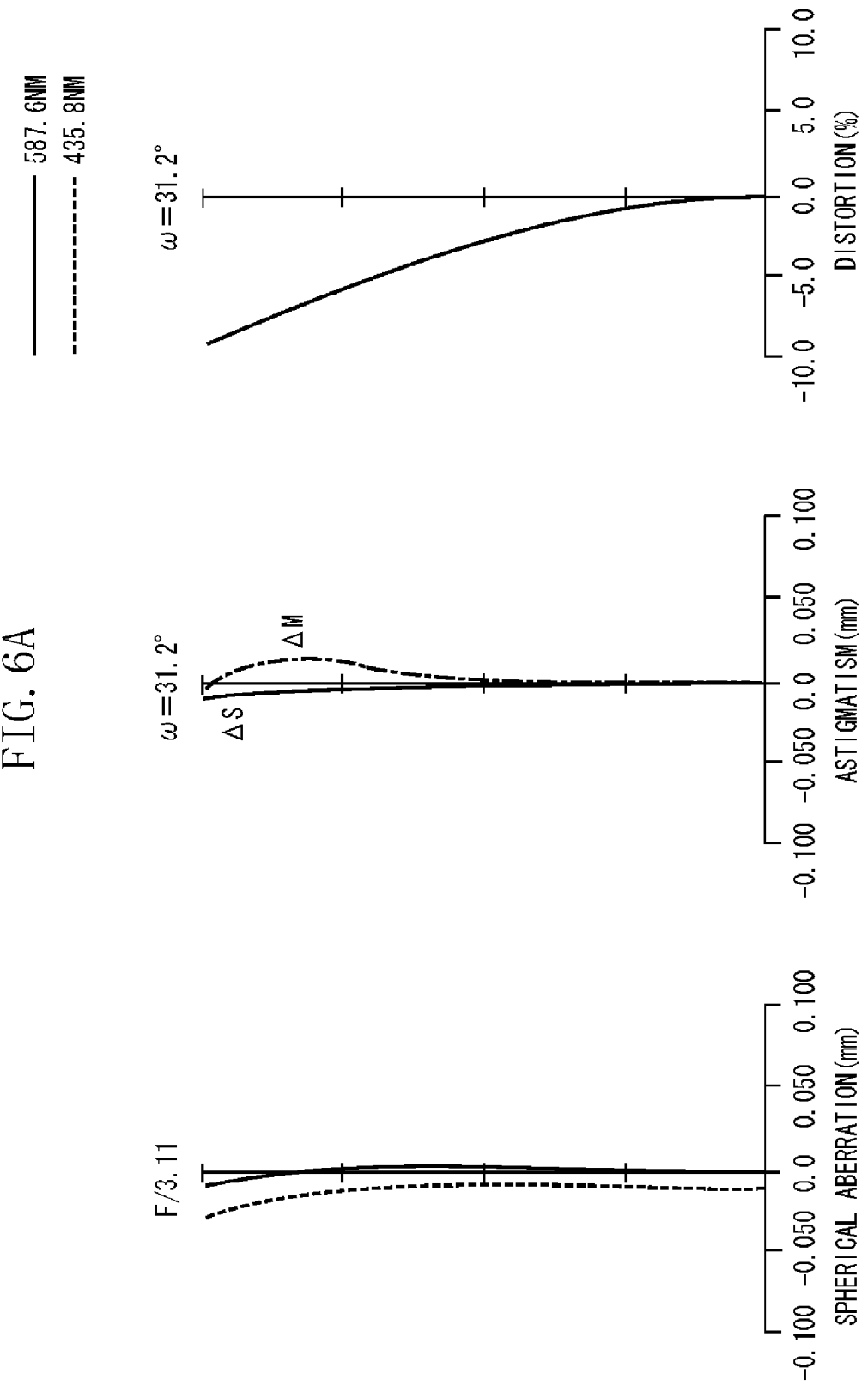
FIGS. 6A and 6B are aberration charts of the third exemplary embodiment of the present invention.
Figure 6B:
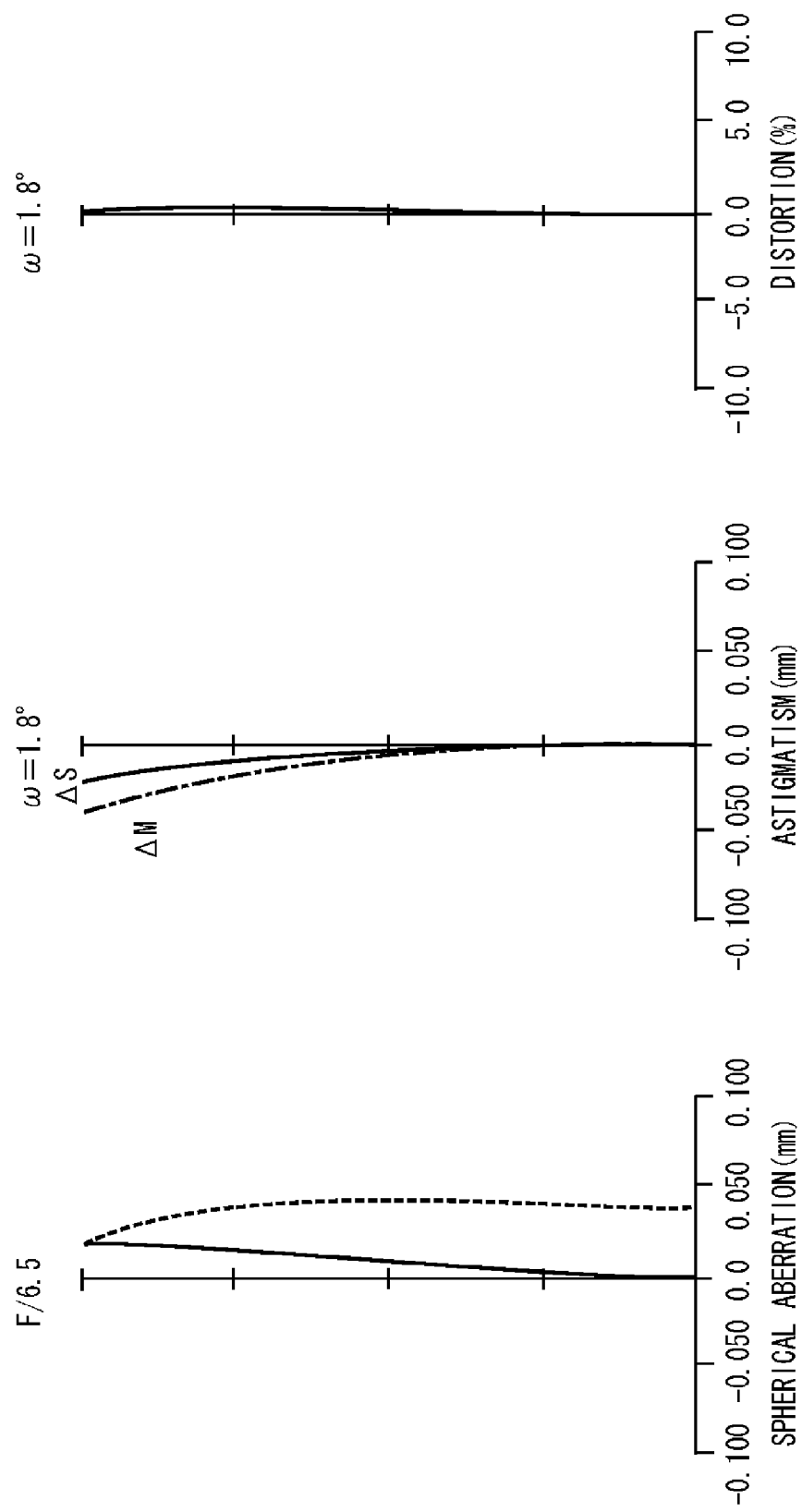

FIG. 5 illustrates a lens cross section along a developed optical path of the zoom lens at the wide-angle end according to a third exemplary embodiment of the present invention. FIG. 6A is an aberration chart of the zoom lens according to the third exemplary embodiment at the wide-angle end. FIG. 6B is an aberration chart of the zoom lens according to the third exemplary embodiment at the telephoto end.

Figure 7:
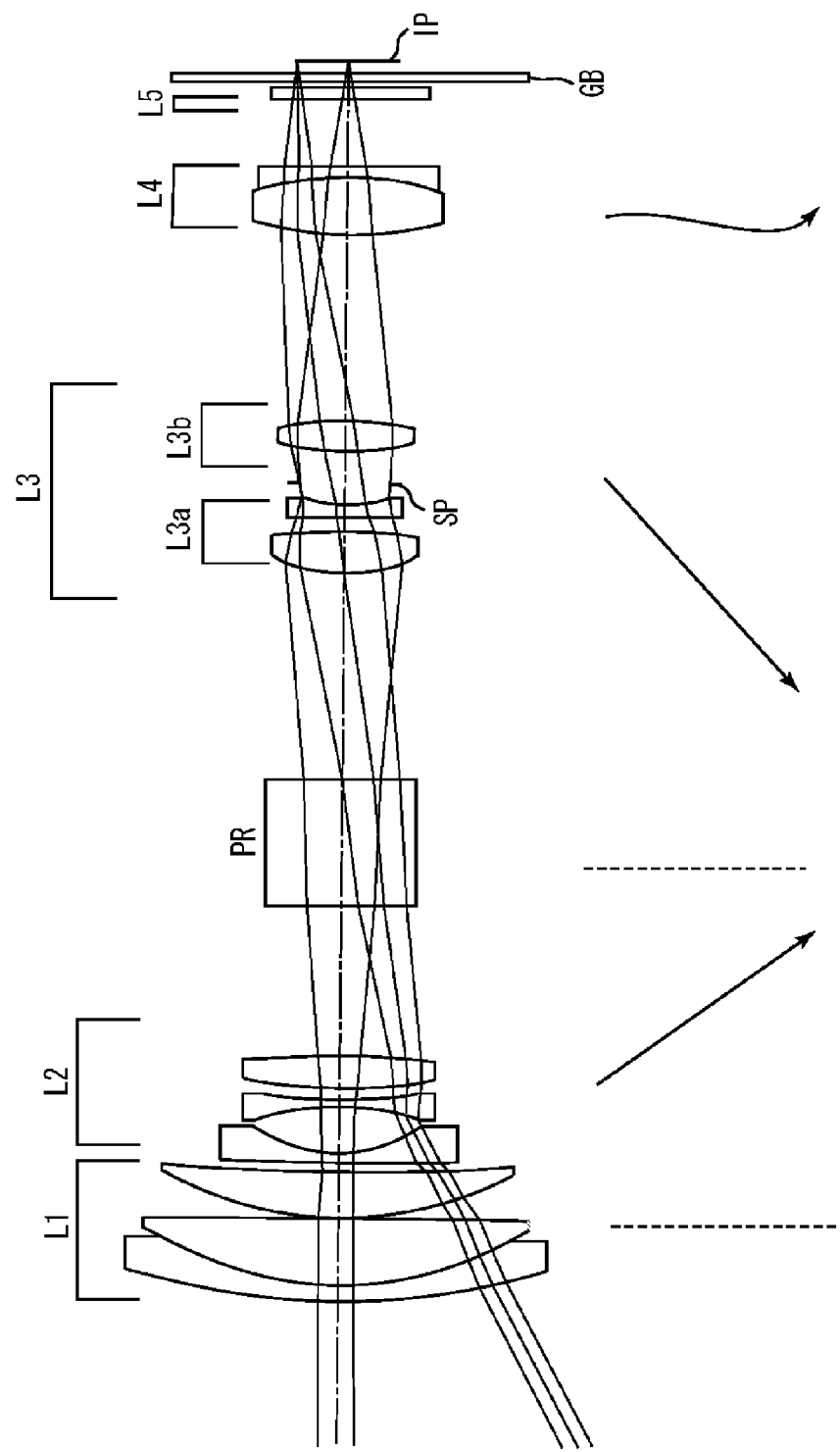
FIG. 7 illustrates a lens cross section along a developed optical path according to a fourth exemplary embodiment of the present invention.
Figure 8A:
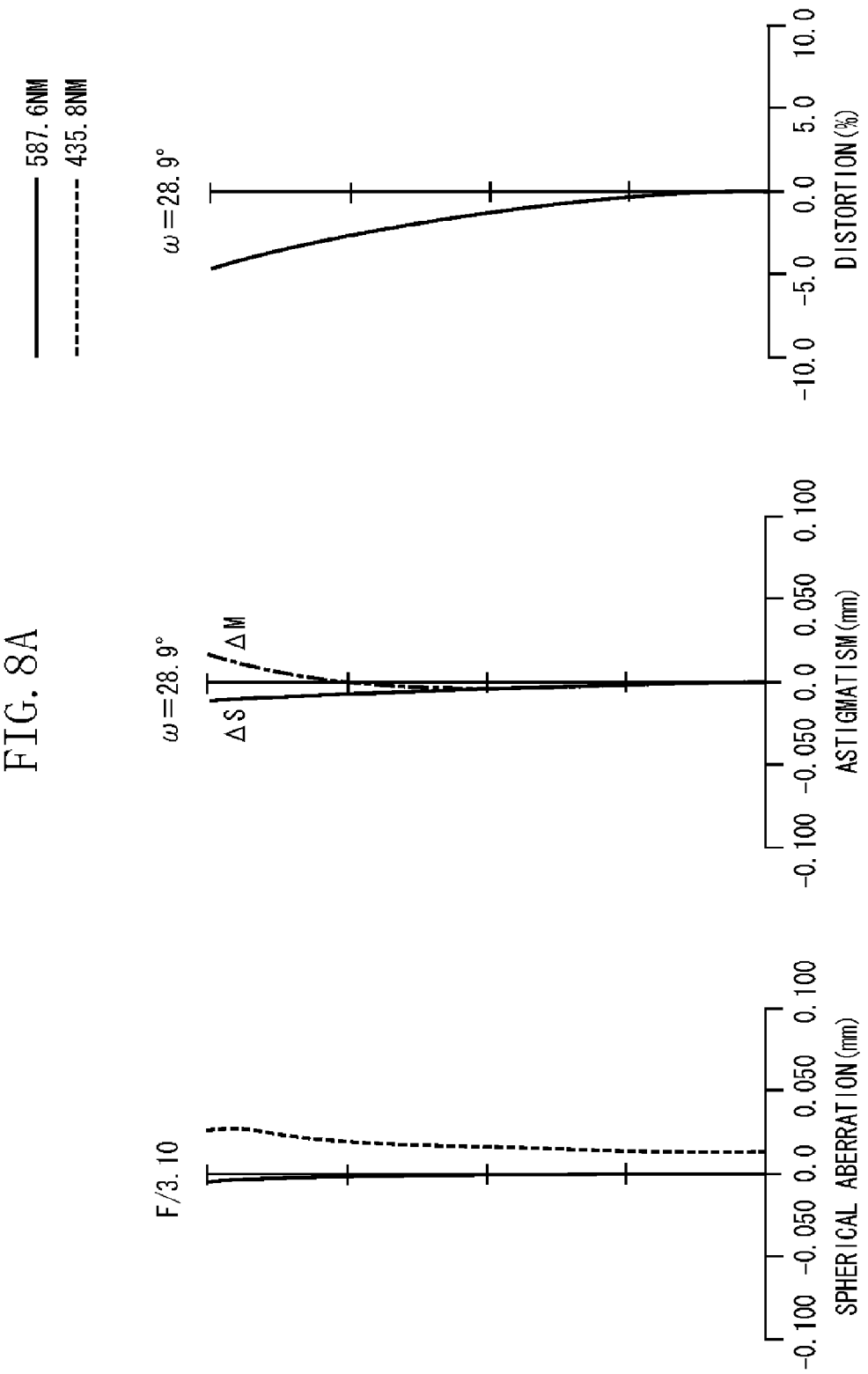
FIGS. 8A and 8B are aberration charts of the fourth exemplary embodiment of the present invention.
Figure 8B:
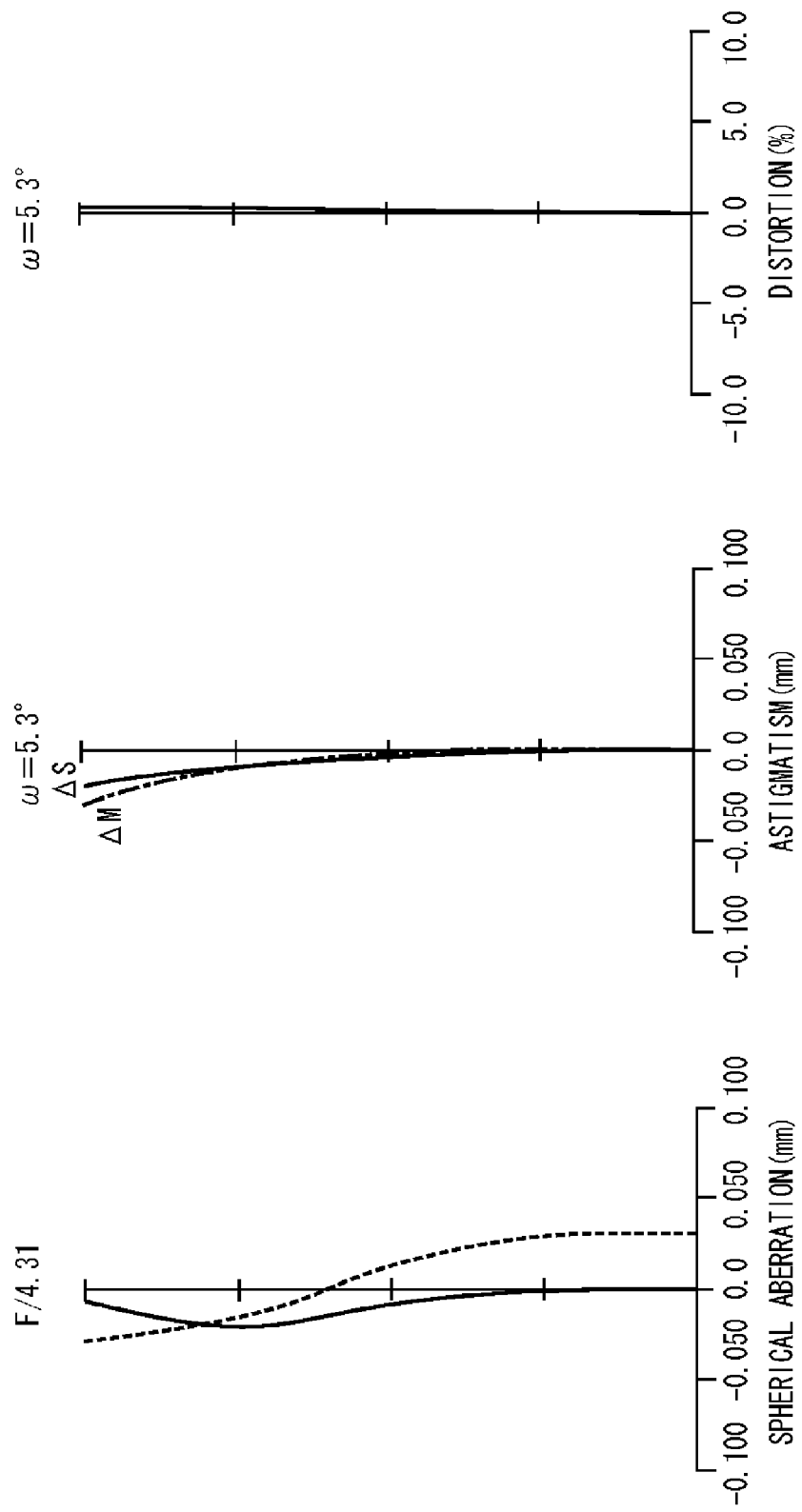

FIG. 7 illustrates a lens cross section along a developed optical path of the zoom lens at the wide-angle end according to a fourth exemplary embodiment of the present invention. FIG. 8A is an aberration chart of the zoom lens according to the fourth exemplary embodiment at the wide-angle end. FIG. 8B is an aberration chart of the zoom lens according to the fourth exemplary embodiment at the telephoto end.

Figure 9:
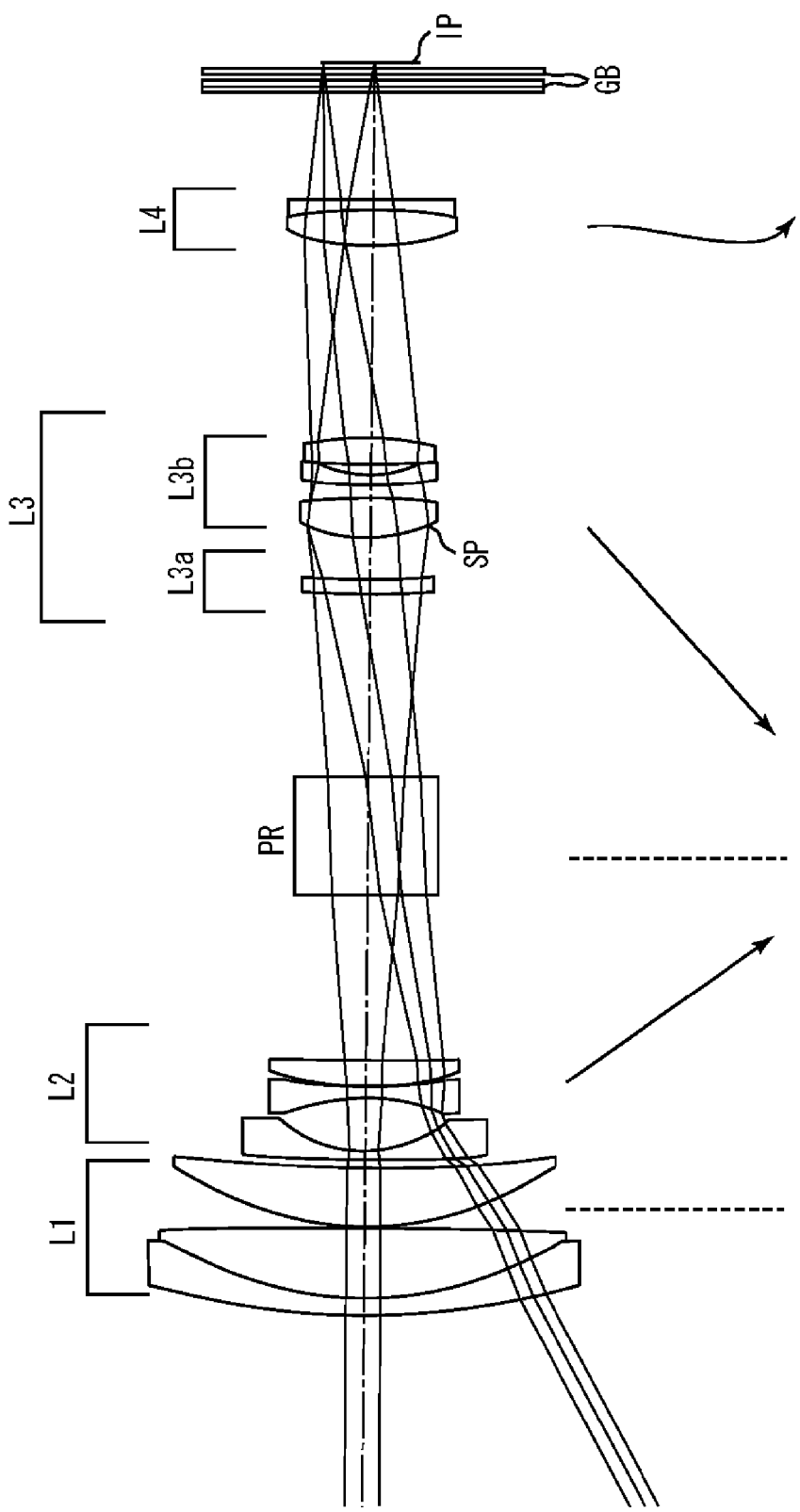
FIG. 9 illustrates a lens cross section along a developed optical path according to a fifth exemplary embodiment of the present invention.

FIG. 9 illustrates a lens cross section along a developed optical path of the zoom lens at the wide-angle end according to a fifth exemplary embodiment of the present invention. FIG. 10A is an aberration chart of the zoom lens according to the fifth exemplary embodiment at the wide-angle end. FIG. 10B is an aberration chart of the zoom lens according to the fifth exemplary embodiment at the telephoto end.

Figure 11:
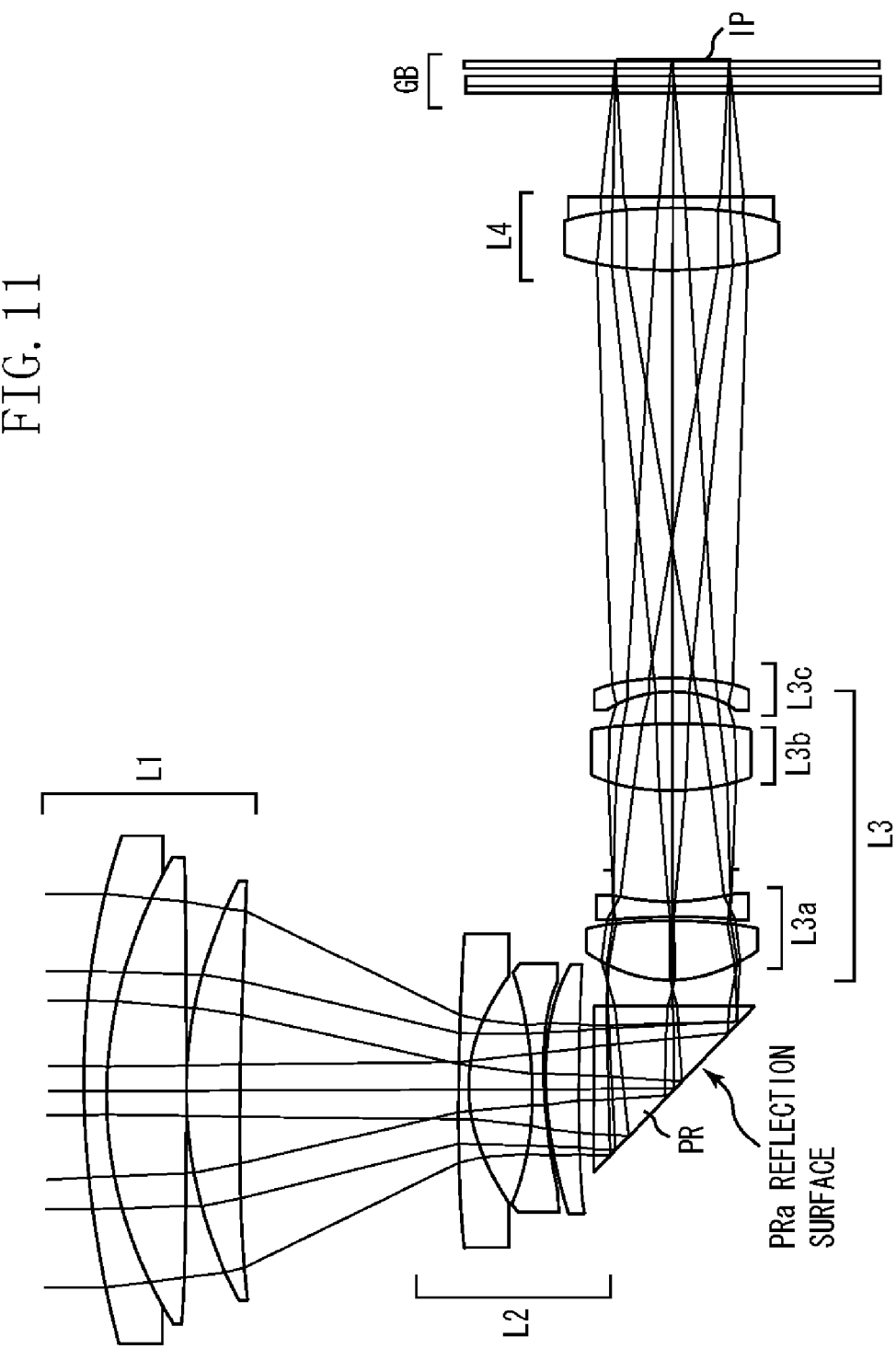
FIG. 11 illustrates a lens cross section of the first exemplary embodiment of the present invention.
Figure 12:
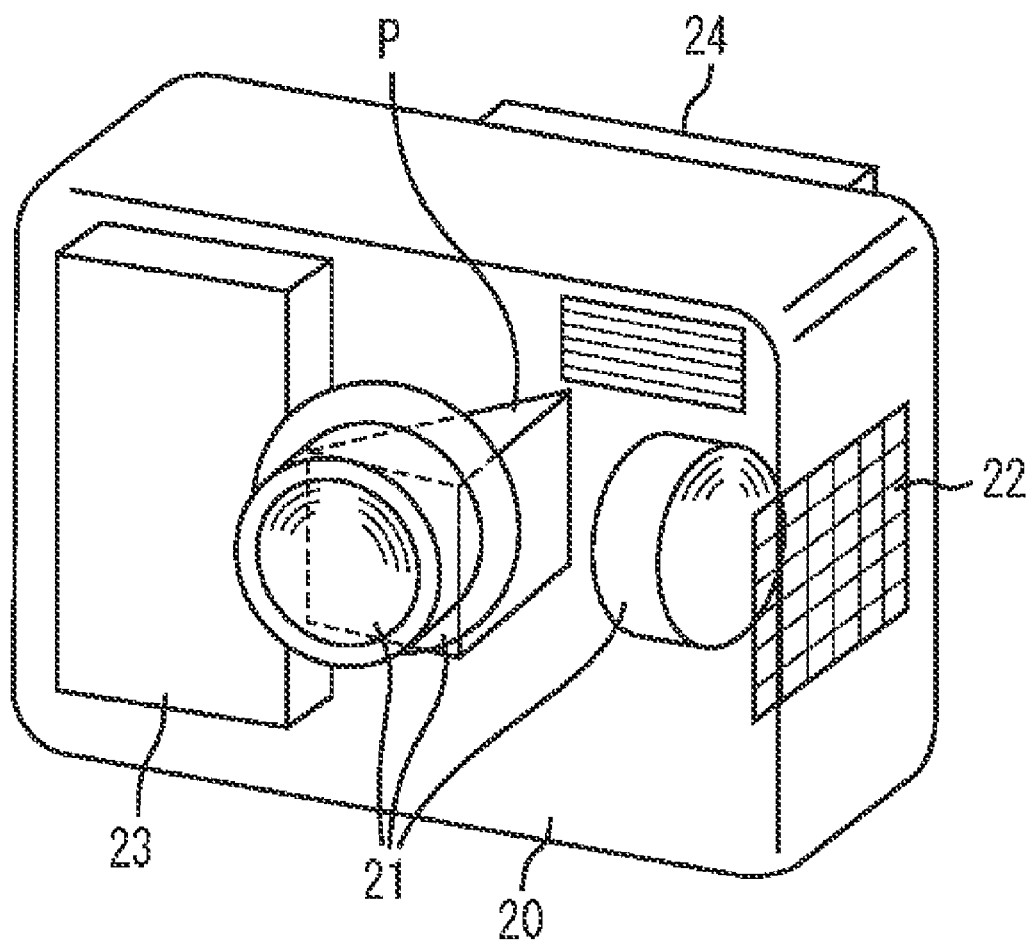
FIG. 12 illustrates exemplary main components of an image pickup apparatus according to an exemplary embodiment of the present invention.

FIG. 11 is a lens cross section at the telephoto end when the optical path of the zoom lens according to the first exemplary embodiment is bent and when the zoom lens is mounted on a camera. FIG. 12 illustrates exemplary main components of a digital camera (image pickup apparatus) according to an exemplary embodiment of the present invention.

The zoom lens according to each exemplary embodiment is a photographic lens used in an image pickup apparatus. In each of the diagrams showing a cross section of a zoom lens (FIGS. 1, 3, 5, 7, and 9), an object side (front side) is indicated at the left-hand portion of the figure, and an image side (rear or back side) is indicated at the right-hand portion thereof.

If the zoom lens according to each exemplary embodiment of the present invention is used as a projection lens for a projector, in each of the diagrams showing a cross section of a zoom lens (FIGS. 1, 3, 5, 7, and 9), the side of a screen is indicated at the left-hand portion of the figure, and the side of an image to be projected is indicated at the right-hand portion thereof.

In each of the diagrams showing a cross section of a zoom lens (FIGS. 1, 3, 5, 7, and 9), "i" denotes the order of a lens unit from the object side and "Li" denotes an i-th lens unit. In addition, in each of the diagrams showing a cross section of a zoom lens (FIGS. 1, 3, 5, 7, and 9), L1 denotes a first lens unit having a positive refractive power (optical power=an inverse of the focal length), L2 denotes a second lens unit having a negative refractive power, L3 denotes a third lens unit having a positive refractive power, L4 denotes a fourth lens unit having a positive refractive power, and L5 denotes a fifth lens unit having a positive or negative refractive power.

A reflection member (prism member) PR includes a reflection surface PRa. The reflection member PR is located between the second lens unit L2 and the third lens unit L3. As illustrated in FIG. 11, the reflection member PR bends a ray on the optical axis by 90 degrees relative to a direction of incidence.

"SP" denotes an aperture stop. "GB" denotes an optical (glass) block that is equivalent to an optical filter or a face plate. "IP" denotes an image plane. The image plane IP is, when the zoom lens is used as a photographic optical system of a video camera or a digital still camera, equivalent to an imaging plane of a solid-state image sensor (photoelectric conversion element) such as a charge-coupled device (CCD) sensor or a complementary metal-oxide semiconductor (CMOS) sensor. The image plane IP is, when the zoom lens is used as a photographic optical system of a silver-halide film camera, equivalent to a film (photosensitive) surface. An arrow indicates a moving locus of each lens unit during zooming from the wide-angle end to the telephoto end.

The zoom lens according to each exemplary embodiment can secure a desired zoom ratio (magnification ratio) by moving the two or more lens units except the reflection member PR during zooming.

In each of the above exemplary embodiments, each of the wide-angle end and the telephoto end refers to a zooming position when a lens unit for varying magnification is positioned at each of the ends of a range in which the magnification varying lens unit can mechanically move along an optical axis.

In a positive lead-type zoom lens according to each exemplary embodiment, the effective diameter thereof is relatively small in the optical path between the second lens unit L2 and the third lens unit L3. Accordingly, it is useful if the reflection member PR for bending the optical path is located between the second lens unit L2 and the third lens unit L3. The reflection member PR includes a reflection surface PRa configured to bend the optical path of the optical system by 90 degrees or by appropriately 90 degrees (90 plus or minus 10 degrees).

FIG. 11 illustrates a lens cross section with an optical path bent by the reflection member PR. As illustrated in FIG. 11, an exemplary embodiment of the present invention can reduce the thickness of the camera (image pickup apparatus) including the zoom lens according to each exemplary embodiment by bending the optical path by 90 degrees using the prism member PR including the reflection surface PRa.

The third lens unit L3 includes, in order from the object side to the image side, a first lens sub-unit L3a having a positive or a negative refractive power and stationary during image shake correction and a second lens sub-unit L3b having a positive or a negative refractive power and movable for correcting an image shake. It is also useful if a third lens sub-unit L3c having a positive or a negative refractive power is located on the image side of the second lens sub-unit L3b.

The second lens sub-unit L3b is movable in a direction having a component perpendicular to the optical axis to correct an image shake. The lens unit for correcting an image shake according to each exemplary embodiment of the present invention is not limited to the above-described configuration in which the lens unit moves in a direction having a component perpendicular to the optical axis. More specifically, it is also useful if the lens unit for correcting an image shake moves on a curved surface around a specific point on the optical axis. In this case, for example, the second lens sub-unit L3b for correcting an image shake is movable in a direction having a component perpendicular to the optical axis to displace an image forming position.

In the zoom lens according to each exemplary embodiment, the distance between the second lens unit L2 and the third lens unit L3 becomes smallest at the telephoto end. Therefore, if an image shake is corrected by displacing the entire third lens unit L3 in a direction having a component perpendicular to the optical axis, lens barrels of the second lens unit L2 and the third lens unit L3 may interfere with each other if the vibration angle of the zoom lens is large or if the distance between the second lens unit L2 and the third lens unit L3 is large.

Accordingly, in an exemplary embodiment of the present invention, the third lens unit L3 is divided into a plurality of lens sub-units, and only the second lens sub-unit L3b, which is located on the image side of the third lens unit L3, is moved in a direction having a component perpendicular to the optical axis to correct an image shake. With the above-described configuration, an exemplary embodiment of the present invention can correct an image shake without causing the lens barrels of the second lens unit L2 and the third lens unit L3 to interfere with each other even if the vibration angle of the zoom lens is large.

In each exemplary embodiment, a lateral magnification of the second lens sub-unit L3b when focusing on an infinitely-distant object at the telephoto end ($\beta 3b$), an overall lateral magnification of a lens section located closer to the image side than the second lens sub-unit L3b ($\beta r$), a distance from a lens surface of the third lens unit L3 (the first lens sub-unit L3a) closest to the object side to a lens surface of the second lens sub-unit L3b closest to the object side (L3is), and a thickness of the third lens unit L3 in the direction of the optical axis (DL3) can satisfy the following conditions:

$$1<(1-\beta 3b)\beta r<3 \qquad (1)$$

$$0.3<L3is/DL3<0.99 \qquad (2)$$

The condition (1) provides a condition for calculating a driving amount (sensitivity) in driving the second lens sub-unit (correction lens unit) L3b in a direction perpendicular to the optical axis to correct an image shake of a specific amount. If the lower limit of the condition (1) is exceeded, then the driving amount increases and the amount of variation of aberration occurring during image shake correction may become large. On the other hand, if the upper limit of the condition (1) is exceeded, then the refractive power of the second lens sub-unit L3b becomes large and a large amount of variation of aberration may occur.

In addition, the range of the value in the condition (1) can be altered as follows:

$$1.2<(1-\beta 3b)\beta r<2.3 \qquad (1a)$$

The condition (2) provides a condition for the distance from a lens surface of the third lens unit L3 closest to the object side to a lens surface of the second lens sub-unit L3b, which is a lens sub-unit for correcting an image shake, in relation to the thickness of the third lens unit L3.

If the lower limit of the condition (2) is exceeded, then the image shake correcting lens unit is located at a position close to the reflection member (prism member). Accordingly, the lens barrels of the second lens unit L2 and the third lens unit L3 may interfere with each other particularly at the telephoto end if the amount of correcting an image shake is large. In addition, in this case, it becomes necessary to increase the distance between the image shake correcting lens unit and an adjacent reflection member PR, which may increase the size of the optical system.

Moreover, the range of the value in the condition (2) can be altered as follows:

$$0.3<L3is/L3<0.9 \qquad (2a)$$

With the above-described configuration, each exemplary embodiment of the present invention can effectively correct an image shake without increasing the size of the optical system even if the angle of vibration of the zoom lens is large or if the amount of driving the correction lens unit is large due to a high zoom ratio.

In each exemplary embodiment, it is yet further useful if an overall focal length of a lens section located closer to the image side than the second lens sub-unit L3b when focusing on an infinitely-distant object at the telephoto end (fr), a focal length of the entire zoom lens at the wide-angle end (fw), a focal length of the entire zoom lens at the telephoto end (ft), a focal length of the third lens unit L3 (f3), a focal length of the second lens sub-unit L3b (f3b), an effective diameter of a lens surface of the second lens unit L2 on the image side (Φ2r), a thickness of the reflection member PR in the direction of the optical axis (the length on the optical axis from the entrance surface of the reflection member PR to the exit surface thereof) (Lp), and the distance from the exit surface of the reflection member PR to a lens surface of the third lens unit L3 closest to the object side at the telephoto end (Lp3) can satisfy at least one of the following conditions to achieve an effect corresponding to each condition:

$$0.1<|fr/\sqrt{fw \cdot ft}|<3.0 \qquad (3)$$

$$1.5<f3/fw<3.2 \qquad (4)$$

$$0.5<f3b/f3<1.5 \qquad (5)$$

$$0.7<(Lp+Lp3)/\Phi 2r<1.5 \qquad (6)$$

The condition (3) provides a condition for an overall focal length of a lens section located closer to the image side than the second lens sub-unit L3b. If the lower limit of the condition (3) is exceeded, then the driving amount of the second lens sub-unit L3b for correcting an image shake may increase. On the other hand, if the upper limit of the condition (3) is exceeded, then the mechanical follow-up performance may degrade.

In each exemplary embodiment, it is yet further useful if the range of the value in the condition (3) can be altered as follows:

$$0.4<|fr/\sqrt{fw \cdot ft}|<2.0 \qquad (3a)$$

The condition (4) provides a condition for a focal length of the third lens unit L3. If the lower limit of the condition (4) is exceeded, then the refractive power of the third lens unit L3 becomes large. In this case, a large amount of aberration variation may occur during zooming. On the other hand, if the upper limit of the condition (4) is exceeded, then the refractive power of the third lens unit L3 becomes small. In this case, the driving amount of driving the third lens unit L3 necessary for securing a desired zoom ratio (magnification ratio) may increase, which may result in increasing the size of the optical system.

Furthermore, the range of the value in the condition (4) can be altered as follows:

$$2.4<f3/fw<3.2 \qquad (4a)$$

The condition (5) provides a condition for the ratio of the focal length of the second lens sub-unit L3b to the focal length of the third lens unit L3. If the lower limit of the condition (5) is exceeded, then the refractive power of the second lens sub-unit L3b may increase. In this case, it becomes difficult to reduce the aberration variation that may occur during image shake correction. On the other hand, if the upper limit of the condition (5) is exceeded, then the driving amount of driving the second lens sub-unit L3b necessary for correcting an image shake may become large.

In addition, the range of the value in the condition (5) can be altered as follows:

$$0.7<f3b/f3<1.2 \qquad (5a)$$

The condition (6) provides a condition for the ratio of the distance from the entrance surface of the reflection member to the lens surface of the third lens unit L3 closest to the object side to the effective diameter of the lens surface of the second lens unit L2 closest to the image side. If the lower limit of the condition (6) is exceeded, then the distance between the reflection member PR and the third lens unit L3 becomes very small. In this case, the lens barrels of the second lens unit L2 and the third lens unit L3 may easily interfere with each other during image shake correction. On the other hand, if the upper limit of the condition (6) is exceeded, then the distance between the reflection member PR and the third lens unit L3 may become extremely large. In this case, the size of the zoom lens may become large.

Moreover, the range of the value in the condition (6) can be altered as follows:

$$0.7<(Lp+Lp3)/\Phi 2r<1.2 \qquad (6a)$$

Now, an exemplary lens configuration of each exemplary embodiment will be described in detail below. To begin with, the zoom lens according to the first exemplary embodiment illustrated in FIG. 1 will be described in detail.

The zoom lens according to the first exemplary embodiment includes, in order from the object side to the image side, the first lens unit L1 having a positive refractive power, the second lens unit L2 having a negative refractive power, the reflection member PR, the third lens unit L3 having a positive refractive power, and the fourth lens unit L4 having a positive refractive power. Furthermore, the reflection surface PRa for bending the optical path of the light from the object is located within the reflection member PR, which includes a prism.

During zooming from the wide-angle end to the telephoto end, the reflection member PR is stationary (is not moved). The refractive powers of the second lens unit L2 and the third lens unit L3 are relatively large in order to achieve a high zoom ratio while securing a space for disposing the reflection member. During zooming from the wide-angle end to the telephoto end, the second lens unit L2 moves towards the image side. However, the present invention is not limited to this. That is, the second lens unit L2 can move with a locus convex towards the image side.

Furthermore, the third lens unit L3 moves towards the object side. Accordingly, the present embodiment can achieve a zoom ratio as high as about ten times. In addition, the fourth lens unit L4 moves with a locus convex towards the object side to correct variation of the position of the image plane that may occur during variation of magnification. In the present exemplary embodiment, the fourth lens unit L4 executes focusing when the shooting distance (object distance) changes.

The third lens unit L3 includes, in order from the object side to the image side, the first lens sub-unit L3a having a positive refractive power, the second lens sub-unit L3b having a positive refractive power, and the third lens sub-unit L3c having a negative refractive power.

The present exemplary embodiment changes the image forming position (corrects an image shake (executes image stabilization)) by moving the second lens sub-unit L3b in a direction having a component perpendicular to the optical axis.

Accordingly, the present exemplary embodiment can secure a sufficient driving amount of the second lens sub-unit L3b, which is a lens sub-unit for correcting an image shake, without increasing the distance between the reflection member PR and the third lens unit L3 at the telephoto end. Moreover, by using the additional lens sub-unit L3c having a negative refractive power, the present exemplary embodiment can increase the refractive power of the second lens sub-unit L3b while increasing the lateral magnification of the second lens sub-unit L3b on the image side.

Accordingly, the amount of driving the second lens sub-unit L3b during image shake correction can be further reduced. In addition, with the above-described configuration, the present exemplary embodiment can reduce the aberration variation that may occur during image stabilization. Furthermore, it is also useful if the second lens sub-unit L3b includes one or more aspheric surfaces. With this configuration, variation of coma, which may occur during image stabilization, can be easily reduced.

Now, the zoom lens according to the second exemplary embodiment illustrated in FIG. 3 will be described in detail below. The second exemplary embodiment is different from the above-described first exemplary embodiment with respect to the lens configuration of the third lens unit L3. More specifically, in the present exemplary embodiment, the third lens unit L3 includes, in order from the object side to the image side, a first lens sub-unit L3a having a positive refractive power and a second lens sub-unit L3b having a positive refractive power.

The present exemplary embodiment moves the second lens sub-unit L3b in a direction having a component perpendicular to the optical axis to displace an image forming position. The present exemplary embodiment is different from the first exemplary embodiment in the above-described points and other configurations of the present exemplary embodiment are similar to those of the first exemplary embodiment.

By using the zoom lens according to the second exemplary embodiment, a magnification ratio (zoom ratio) as high as about ten times can be achieved.

Now, the zoom lens according to the third exemplary embodiment illustrated in FIG. 5 will be described in detail below.

The zoom lens according to the present exemplary embodiment is different from the first exemplary embodiment in the point that in the present exemplary embodiment, the first lens unit L1 moves during zooming. More specifically, in the present exemplary embodiment, the first lens unit L1 moves with a locus convex towards the image side during zooming from the wide-angle end to the telephoto end.

By using the zoom lens according to the third exemplary embodiment, a magnification ratio (zoom ratio) as high as about twenty times can be achieved. The other configurations of the present exemplary embodiment are similar to those of the first exemplary embodiment.

Now, the zoom lens according to the fourth exemplary embodiment illustrated in FIG. 7 will be described in detail below. The zoom lens according to the fourth exemplary embodiment includes, in order from the object side to the image side, a first lens unit L1 having a positive refractive power, a second lens unit L2 having a negative refractive power, a reflection member PR, a third lens unit L3 having a positive refractive power, a fourth lens unit L4 having a positive refractive power, and a fifth lens unit L5 having a positive refractive power.

During zooming from the wide-angle end to the telephoto end, the first lens unit L1 is stationary while the second lens unit L2 moves towards the image side and the third lens unit L3 moves towards the object side.

The fourth lens unit L4 moves with a locus convex towards the object side to correct the variation of the position of the image plane that may occur during variation of magnification. During zooming, the fifth lens unit L5 is stationary. The fourth lens unit L4 executes focusing.

The third lens unit includes, in order from the object side to the image side, a first lens sub-unit L3a having a positive refractive power and a second lens sub-unit L3b having a positive refractive power. The present exemplary embodiment moves the second lens sub-unit L3b in a direction having a component perpendicular to the optical axis to displace an image forming position.

The zoom lens according to the fourth exemplary embodiment can achieve a magnification ratio (zoom ratio) as high as about six times. The other configurations of the present exemplary embodiment are similar to those of the first exemplary embodiment.

Now, the zoom lens according to the fifth exemplary embodiment illustrated in FIG. 9 will be described in detail below. The present exemplary embodiment is different from the above-described first exemplary embodiment with respect to the lens configuration of the third lens unit L3.

The third lens unit L3 of the fifth exemplary embodiment includes, in order from the object side to the image side, a first lens sub-unit L3a having a negative refractive power and a second lens sub-unit L3b having a positive refractive power. The present exemplary embodiment displaces an image forming position by moving the second lens sub-unit L3b in a direction having a component perpendicular to the optical axis.

The zoom lens according to the present exemplary embodiment can achieve a magnification ratio (zoom ratio) as high as about eight times. The other configurations of the present exemplary embodiment are similar to those of the first exemplary embodiment.

In each exemplary embodiment, it is also useful if the first, the second, and the fourth lens units move during zooming (variation of magnification). Furthermore, it is also useful if the first and the third lens units move during zooming or variation of magnification. In addition, it is also useful if the first, the third, and the fourth lens units move during zooming or variation of magnification.

In the zoom lens according to each of the first through the fifth exemplary embodiments, it is also useful if the opening diameter of the aperture stop SP is controlled to reduce the F value (F-number) during zooming or variation of magnification. If the zoom lens according to each of the first through the fifth exemplary embodiments is used in an image pickup apparatus having an image sensor configured to convert an optical image of an object formed on a light-receiving surface into an electric signal, it is also useful if an electrical correction is executed according to the magnitude of the amount of distortion that may occur in the zoom lens.

As described above, in each exemplary embodiment, the reflection member (prism member) PR having a reflection surface for bending the optical path is located between the second lens unit L2 and the third lens unit L3. Moreover, the reflection member PR is stationary during zooming. In addition, in each exemplary embodiment, two or more of the first through the third lens units are moved during zooming.

With the above-described configuration, each exemplary embodiment of the present invention can reduce the camera thickness (the camera front-to-back length) when applied in a camera while achieving a high zoom ratio.

Furthermore, with the above-described configuration, each exemplary embodiment of the present invention can correct an image shake by displacing the lens sub-unit L3b, which is located on the image side of the third lens unit L3, in a direction having a component perpendicular to the optical axis. Accordingly, each exemplary embodiment of the present invention can secure a sufficient driving amount of the second lens sub-unit L3b, which is an image shake correction lens unit, without causing the lens barrels that support the second lens unit L2 and the third lens unit L3 to interfere with each other at the telephoto end, at which the distance between the second lens unit L2 and the third lens unit L3, which are located adjacent to the prism member, becomes smallest.

An exemplary embodiment of a digital camera (an optical apparatus: i.e., an image pickup apparatus) that uses, as a photographic optical system, a zoom lens according to each exemplary embodiment of the present invention is described below with reference to FIG. 12.

Referring to FIG. 12, the digital camera includes a camera body 20 and a photographic optical system 21. The photographic optical system 21 includes a zoom lens according to any of the first to the fifth exemplary embodiments described above. The photographic optical system 21 further includes a prism P.

The camera body 20 includes a solid-state image sensor (photoelectrical conversion element) 22, such as a CCD sensor or a CMOS sensor, configured to receive an object image formed by the photographic optical system 21. The camera body 20 further includes a recording unit (memory) 23 configured to record the object image formed on the solid-state image sensor 22.

The camera body 20 further includes a viewfinder 24, which includes a liquid crystal display (LCD) panel, configured to allow a user to observe an object image formed on the solid-state image sensor 22.

By applying the zoom lens according to each exemplary embodiment of the present invention to an image pickup apparatus such as a digital camera, a small-sized image pickup apparatus having a high optical performance can be implemented.

Numerical examples 1 through 5, which respectively correspond to the first through the fifth exemplary embodiments of the present invention, are set forth below. In each of the numerical examples 1 through 5, "i" denotes the order of a surface from the object side, "ri" denotes a radius of curvature of the i-th lens surface, "di" denotes a lens thickness or an axial interval between the i-th surface and the (i+1)th surface, "ndi" and "vdi" respectively denote a refractive index and an Abbe number of the i-th optical material with respect to d-line light.

Five surfaces from the image side are planes equivalent to a glass block or a color combining prism. In addition, "k" denotes a conic coefficient, and each of "A4", "A6", "A8", and "A10" denotes an aspheric coefficient. The aspheric shape is expressed as follows:

$$x=(h^2/R)/[1+\{1-(1+k)(h/R)^2\}^{1/2}]+A4h^4+A6h^6+A8h^8+A10h^{10}$$

where "x" denotes a displacement from a surface vertex along the optical axis in a position at a height "h" from the optical axis, and "R" denotes a paraxial radius of curvature. Furthermore, "e-Z" denotes "×10$^{-Z}$." "BF" denotes an air-equivalent back focal length. In addition, the relationship between each condition described above and each numerical example is set forth in Table 1.

Numerical Example 1

| Surface data | | | | | |
|---|---|---|---|---|---|
| Surface No. | r | d | nd | vd | Effective diameter |
| 1 | 45.491 | 1.20 | 1.84666 | 23.8 | 24.11 |
| 2 | 21.920 | 4.28 | 1.59201 | 67.0 | 22.04 |
| 3 | −428.082 | 0.05 | | | 21.52 |
| 4 | 21.101 | 2.89 | 1.77250 | 49.6 | 19.85 |
| 5 | 94.188 | Variable | | | 19.24 |
| 6 | 106.997 | 0.70 | 1.88300 | 40.8 | 14.54 |
| 7 | 8.765 | 3.41 | | | 11.56 |
| 8 | −17.734 | 0.55 | 1.81600 | 46.6 | 11.36 |
| 9 | 19.900 | 0.12 | | | 11.29 |
| 10* | 15.052 | 1.90 | 2.14352 | 17.8 | 11.47 |
| 11 | 70.000 | Variable | | | 11.26 |
| 12 | ∞ | 8.50 | 1.83400 | 37.2 | 8.40 |
| 13 | ∞ | Variable | | | 7.32 |
| 14* | 7.353 | 3.10 | 1.58913 | 61.1 | 8.16 |
| 15 | −31.175 | 0.24 | | | 7.50 |
| 16 | −59.294 | 0.70 | 1.74950 | 35.3 | 7.21 |
| 17 | 11.945 | 1.67 | | | 6.71 |
| stop | ∞ | 4.00 | | | 6.48 |
| 18 | | | | | |
| 19* | 10.412 | 3.58 | 1.49700 | 81.6 | 7.51 |
| 20 | −43.813 | 1.76 | | | 7.19 |
| 21 | −7.050 | 0.70 | 1.71300 | 53.9 | 6.95 |
| 22 | −14.153 | Variable | | | 7.32 |
| 23* | 19.732 | 3.25 | 1.69350 | 53.2 | 10.24 |

-continued

| | | | | | |
|---|---|---|---|---|---|
| 24 | −30.172 | 0.60 | 1.84666 | 23.8 | 9.98 |
| 25 | −152.579 | Variable | | | 9.90 |
| 26 | ∞ | 0.31 | 1.54427 | 70.6 | 20.94 |
| 27 | ∞ | 0.50 | 1.49400 | 75.0 | 20.94 |
| 28 | ∞ | 0.40 | | | 20.94 |
| 29 | ∞ | 0.50 | 1.49831 | 65.1 | 20.94 |
| 30 | ∞ | 0.12 | | | 20.94 |
| Image Plane | ∞ | | | | |

Aspheric Coefficients r10  K = −5.30134e−001  A4 = −1.20991e−005  A6 = 4.32018e−008
     A8 = −1.23062e−008  A10 = 1.61310e−010
r14  K = −3.35905e−001  A4 = −4.82963e−005  A6 = −6.54168e−007
     A8 = −9.30211e−009
r19  K = −3.30880e−001  A4 = −4.79598e−005  A6 = 2.84402e−006
     A8 = −1.29374e−007  A10 = 4.96750e−009
r23  K = −1.34241e−001  A4 = 1.69409e−006   A6 = 7.75735e−007
     A8 = −2.20352e−008  A10 = 3.15210e−010

Various Data

Zoom ratio  9.39

| | Wide-angle end | Middle zoom position | Telephoto end |
|---|---|---|---|
| Focal Length | 7.01 | 35.82 | 65.90 |
| F-number | 3.10 | 4.30 | 5.22 |
| Angle of View | 28.9 | 6.18 | 3.37 |
| Image Height | 3.88 | 3.88 | 3.88 |
| Lens Total Length | 85.60 | 85.56 | 85.57 |
| BF | 0.12 | 0.12 | 0.12 |
| d5 | 0.60 | 9.94 | 12.01 |
| d11 | 11.73 | 2.39 | 0.31 |
| d13 | 16.87 | 4.31 | 1.80 |
| d22 | 6.21 | 15.74 | 23.92 |
| d25 | 5.17 | 8.15 | 2.51 |
| Entrance pupil position | 21.20 | 71.80 | 98.57 |
| Exit pupil position | −34.78 | −140.20 | 276.17 |
| Front principal point position | 26.81 | 98.48 | 180.20 |
| Rear principal point position | −6.90 | −35.71 | −65.77 |

Data of Each Zoom Lens Unit

| Lens unit | 1st surface | Focal length | Lens configuration length | Front principal point position | Rear principal point position |
|---|---|---|---|---|---|
| 1 | 1 | 27.34 | 8.41 | 2.25 | −2.82 |
| 2 | 6 | −7.86 | 6.68 | 1.12 | −3.72 |
| pr | 12 | ∞ | 8.50 | 2.32 | −2.32 |
| 3 | 14 | 19.01 | 15.75 | −3.05 | −13.50 |
| 4 | 23 | 28.14 | 3.85 | 0.08 | −2.17 |
| | 26 | ∞ | 1.71 | 0.63 | −0.63 |

Single Lens Data

| Lens | 1st surface | Focal length |
|---|---|---|
| 1 | 1 | −51.16 |
| 2 | 2 | 35.35 |
| 3 | 4 | 34.61 |
| 4 | 6 | −10.85 |
| 5 | 8 | −11.42 |
| 6 | 10 | 16.47 |

-continued

| | | |
|---|---|---|
| 7 | 12 | 0.00 |
| 8 | 14 | 10.41 |
| 9 | 16 | −13.21 |
| 10 | 19 | 17.31 |
| 11 | 21 | −20.55 |
| 12 | 23 | 17.67 |
| 13 | 24 | −44.52 |
| 14 | 26 | 0.00 |
| 15 | 27 | 0.00 |
| 16 | 29 | 0.00 |

Numerical Example 2

Surface data

| Surface No. | r | d | nd | νd | Effective diameter |
|---|---|---|---|---|---|
| 1 | 41.884 | 1.20 | 1.84666 | 23.8 | 26.65 |
| 2 | 20.833 | 5.47 | 1.59201 | 67.0 | 24.30 |
| 3 | −277.257 | 0.05 | | | 23.37 |
| 4 | 20.346 | 3.20 | 1.77250 | 49.6 | 20.38 |
| 5 | 100.018 | Variable | | | 19.74 |
| 6 | 106.955 | 0.70 | 1.88300 | 40.8 | 14.41 |
| 7 | 8.569 | 3.48 | | | 11.25 |
| 8 | −14.591 | 0.55 | 1.88300 | 40.8 | 11.00 |
| 9 | 21.803 | 0.16 | | | 11.00 |
| 10* | 16.325 | 1.93 | 2.14352 | 17.8 | 11.19 |
| 11 | 377.967 | Variable | | | 11.06 |
| 12 | ∞ | 8.50 | 1.83400 | 37.2 | 8.40 |
| 13 | ∞ | Variable | | | 7.22 |
| 14* | 8.183 | 2.76 | 1.69350 | 53.2 | 7.97 |
| 15 | −156.084 | 0.59 | | | 7.36 |
| 16 | ∞ | 0.61 | | | 6.93 |
| 17 | 150.002 | 0.70 | 1.80610 | 33.3 | 6.50 |
| 18 | 7.604 | 1.56 | | | 6.02 |
| stop | ∞ | 0.88 | | | 6.06 |
| 19 | | | | | |
| 20* | 17.059 | 1.93 | 1.49700 | 81.6 | 7.01 |
| 21 | −27.419 | Variable | | | 7.18 |
| 22* | 17.766 | 2.71 | 1.69350 | 53.2 | 10.84 |
| 23 | −25.209 | 0.60 | 1.84666 | 23.8 | 10.61 |
| 24 | −296.530 | Variable | | | 10.48 |
| 25 | ∞ | 0.31 | 1.54427 | 70.6 | 20.94 |
| 26 | ∞ | 0.50 | 1.49400 | 75.0 | 20.94 |
| 27 | ∞ | 0.40 | | | 20.94 |
| 28 | ∞ | 0.50 | 1.49831 | 65.1 | 20.94 |
| 29 | ∞ | 0.74 | | | 20.94 |
| Image Plane | ∞ | | | | |

Aspheric Coefficients r10  K = −6.83889e−001  A4 = −1.74588e−005  A6 = 9.12125e−008
     A8 = −1.91282e−008  A10 = 2.60759e−010
r14  K = −3.25539e−001  A4 = −3.65995e−005  A6 = −4.25045e−007
     A8 = 8.37541e−010
r20  K = −1.63218e+000  A4 = −3.18974e−005  A6 = 2.69537e−006
     A8 = −2.51783e−007  A10 = 8.99540e−009
r22  K = 1.87341e−001   A4 = 1.91454e−005   A6 = −3.21895e−008
     A8 = 7.84140e−009  A10 = −1.51657e−010

Various Data

Zoom ratio  9.40

| | Wide-angle end | Middle zoom position | Telephoto end |
|---|---|---|---|
| Focal Length | 7.01 | 21.57 | 65.96 |
| F-number | 3.10 | 3.89 | 5.18 |
| Angle of View | 28.9 | 10.2 | 3.36 |
| Image Height | 3.88 | 3.88 | 3.88 |

-continued

| | | | |
|---|---|---|---|
| Lens Total Length | 87.70 | 87.65 | 87.68 |
| BF | 0.74 | 0.74 | 0.74 |
| d5 | 0.60 | 6.72 | 10.64 |
| d11 | 10.35 | 4.22 | 0.30 |
| d13 | 17.12 | 7.30 | 1.80 |
| d21 | 13.24 | 20.99 | 33.03 |
| d24 | 6.36 | 8.39 | 1.87 |
| Entrance pupil position | 22.97 | 53.58 | 104.90 |
| Exit pupil position | −44.21 | −150.70 | 126.82 |
| Front principal point position | 28.89 | 72.07 | 205.37 |
| Rear principal point position | −6.27 | −20.83 | −65.22 |

Data of Each Zoom Lens Unit

| Lens unit | 1st surface | Focal length | Lens configuration length | Front principal point position | Rear principal point position |
|---|---|---|---|---|---|
| 1 | 1 | 25.10 | 9.92 | 2.89 | −3.16 |
| 2 | 6 | −7.35 | 6.82 | 1.11 | −3.91 |
| pr | 12 | ∞ | 8.50 | 2.32 | −2.32 |
| 3 | 14 | 21.00 | 9.03 | 0.27 | −7.70 |
| 4 | 22 | 27.79 | 3.31 | −0.12 | −2.03 |
| | 25 | ∞ | 1.71 | 0.63 | −0.63 |

Single Lens Data

| Lens | 1st surface | Focal length |
|---|---|---|
| 1 | 1 | −50.27 |
| 2 | 2 | 32.96 |
| 3 | 4 | 32.50 |
| 4 | 6 | −10.59 |
| 5 | 8 | −9.83 |
| 6 | 10 | 14.88 |
| 7 | 12 | 0.00 |
| 8 | 14 | 11.29 |
| 9 | 17 | −9.96 |
| 10 | 20 | 21.47 |
| 11 | 22 | 15.43 |
| 12 | 23 | −32.57 |
| 13 | 25 | 0.00 |
| 14 | 26 | 0.00 |
| 15 | 28 | 0.00 |

Numerical Example 3

Surface data

| Surface No. | r | d | nd | vd | Effective diameter |
|---|---|---|---|---|---|
| 1 | 69.849 | 1.23 | 1.84666 | 23.8 | 34.96 |
| 2 | 35.896 | 7.12 | 1.49700 | 81.5 | 34.05 |
| 3 | −264.127 | 0.05 | | | 33.82 |
| 4 | 31.080 | 4.18 | 1.77250 | 49.6 | 32.72 |
| 5 | 97.197 | Variable | | | 32.17 |
| 6 | 48.513 | 0.72 | 1.88300 | 40.8 | 17.12 |
| 7 | 10.385 | 4.13 | | | 13.86 |
| 8 | −20.090 | 0.56 | 1.77250 | 49.6 | 13.62 |
| 9 | 19.881 | 0.01 | | | 13.35 |
| 10* | 13.218 | 2.00 | 2.14352 | 17.8 | 13.58 |
| 11 | 30.000 | Variable | | | 13.23 |
| 12 | ∞ | 8.71 | 1.83400 | 37.2 | 7.62 |
| 13 | ∞ | Variable | | | 6.65 |
| 14* | 7.947 | 3.29 | 1.58913 | 61.1 | 9.01 |
| 15 | −48.570 | 0.05 | | | 8.39 |
| 16 | 71.006 | 0.72 | 1.74950 | 35.3 | 8.15 |
| 17 | 9.442 | 1.99 | | | 7.55 |
| stop 18 | ∞ | 3.61 | | | 7.41 |
| 19* | 10.385 | 3.70 | 1.45650 | 90.3 | 8.47 |
| 20 | −67.109 | 5.94 | | | 8.23 |
| 21 | −7.573 | 0.55 | 1.58913 | 61.1 | 7.50 |
| 22 | −48.018 | Variable | | | 7.96 |
| 23* | 24.190 | 4.20 | 1.69350 | 53.2 | 11.17 |
| 24 | −12.383 | 0.61 | 1.84666 | 23.8 | 11.25 |
| 25 | −20.531 | Variable | | | 11.40 |
| 26 | ∞ | 0.32 | 1.54427 | 70.6 | 21.46 |
| 27 | ∞ | 0.51 | 1.49400 | 75.0 | 21.46 |
| 28 | ∞ | 0.41 | | | 21.46 |
| 29 | ∞ | 0.51 | 1.49831 | 65.1 | 21.46 |
| 30 | ∞ | 0.11 | | | 21.46 |
| Image Plane | ∞ | | | | |

Aspheric Coefficients r10  K = −7.60271e−001  A4 = −2.14965e−005  A6 = −8.27907e−008
    A8 = −1.85857e−009  A10 = 2.38955e−011
r14  K = −3.81331e−001  A4 = −6.18891e−005  A6 = −6.15089e−007
    A8 = −1.05099e−008
r19  K = −3.53354e−001  A4 = −4.79216e−005  A6 = 2.24978e−008
    A8 = 1.03870e−008  A10 = 7.88194e−011
r23  K = −1.63549e+000  A4 = −1.48372e−005  A6 = −3.23057e−008
    A8 = 6.95691e−009  A10 = −1.44518e−010

Various Data

| Zoom ratio | | 19.17 | |
|---|---|---|---|
| | Wide-angle end | Middle zoom position | Telephoto end |
| Focal Length | 6.41 | 16.54 | 122.84 |
| F-number | 3.11 | 3.86 | 6.47 |
| Angle of View | 31.2 | 13.2 | 1.81 |
| Image Height | 3.88 | 3.88 | 3.88 |
| Lens Total Length | 105.26 | 101.11 | 106.54 |
| BF | 0.11 | 0.11 | 0.11 |
| d5 | 0.62 | 10.95 | 27.64 |
| d11 | 26.50 | 12.02 | 0.75 |
| d13 | 15.43 | 6.19 | 1.30 |
| d22 | 4.91 | 7.55 | 19.22 |
| d25 | 2.57 | 9.16 | 2.39 |
| Entrance pupil position | 25.41 | 54.63 | 268.27 |
| Exit pupil position | −65.67 | −206.91 | 45.34 |
| Front principal point position | 31.19 | 69.85 | 724.79 |
| Rear principal point position | −6.29 | −16.42 | −122.73 |

Data of Each Zoom Lens Unit

| Lens unit | 1st surface | Focal length | Lens configuration length | Front principal point position | Rear principal point position |
|---|---|---|---|---|---|
| 1 | 1 | 46.71 | 12.58 | 3.77 | −4.09 |
| 2 | 6 | −9.59 | 7.42 | 1.89 | −3.39 |
| pr | 12 | ∞ | 8.71 | 2.38 | −2.38 |
| 3 | 14 | 19.20 | 19.84 | −12.58 | −17.01 |

-continued

| 4 | 23 | 18.10 | 4.81 | 1.55 | −1.39 |
|---|----|-------|------|------|-------|
|   | 26 | ∞     | 1.75 | 0.65 | −0.65 |

Single Lens Data

| Lens | 1st surface | Focal length |
|------|-------------|--------------|
| 1  | 1  | −88.69 |
| 2  | 2  | 64.09  |
| 3  | 4  | 57.56  |
| 4  | 6  | −15.10 |
| 5  | 8  | −12.86 |
| 6  | 10 | 19.43  |
| 7  | 12 | 0.00   |
| 8  | 14 | 11.85  |
| 9  | 16 | −14.60 |
| 10 | 19 | 20.00  |
| 11 | 21 | −15.34 |
| 12 | 23 | 12.39  |
| 13 | 24 | −38.18 |
| 14 | 26 | 0.00   |
| 15 | 27 | 0.00   |
| 16 | 29 | 0.00   |

Numerical Example 4

Surface data

| Surface No. | r | d | nd | vd | Effective diameter |
|---|---|---|---|---|---|
| 1   | ∞        | 0.00     |         |      | 200.00 |
| 2   | 40.005   | 1.20     | 1.84666 | 23.8 | 24.41  |
| 3   | 21.097   | 4.57     | 1.59201 | 67.0 | 22.39  |
| 4   | −1426.250| 0.05     |         |      | 21.86  |
| 5   | 21.443   | 3.07     | 1.77250 | 49.6 | 20.54  |
| 6   | 100.957  | Variable |         |      | 19.87  |
| 7   | 123.947  | 0.70     | 1.88300 | 40.8 | 13.46  |
| 8   | 8.597    | 3.15     |         |      | 10.77  |
| 9   | −14.986  | 0.55     | 1.88300 | 40.8 | 10.55  |
| 10  | 28.647   | 0.67     |         |      | 10.58  |
| 11* | 24.004   | 2.23     | 2.14352 | 17.8 | 10.88  |
| 12  | −128.210 | Variable |         |      | 10.78  |
| 13  | ∞        | 8.50     | 1.83400 | 37.2 | 8.38   |
| 14  | ∞        | Variable |         |      | 7.82   |
| 15  | ∞        | 0.75     |         |      | 8.00   |
| 16  | ∞        | −0.75    |         |      | 8.01   |
| 17* | 7.916    | 2.91     | 1.69350 | 53.2 | 8.01   |
| 18  | −90.395  | 0.57     |         |      | 7.26   |
| 19  | ∞        | 0.59     |         |      | 6.75   |
| 20  | −237.200 | 0.70     | 1.80610 | 33.3 | 6.29   |
| 21  | 7.398    | 1.52     |         |      | 5.75   |
| stop 22 | ∞    | 2.25     |         |      | 5.76   |
| 23* | 14.747   | 2.11     | 1.49700 | 81.6 | 7.27   |
| 24  | −24.750  | Variable |         |      | 7.52   |
| 25* | 18.800   | 4.00     | 1.69350 | 53.2 | 10.66  |
| 26  | −18.431  | 0.60     | 1.76182 | 26.5 | 10.24  |
| 27  | 694.626  | Variable |         |      | 10.05  |
| 28  | 115.000  | 0.81     | 1.51633 | 64.1 | 8.83   |
| 29  | ∞        | 0.00     |         |      | 8.71   |
| 30  | ∞        | 0.40     |         |      | 20.94  |
| 31  | ∞        | 0.50     | 1.49831 | 65.1 | 20.94  |
| 32  | ∞        | 1.11     |         |      | 20.94  |
| Image Plane | ∞ |          |         |      |        |

Aspheric Coefficients r11  K = 3.75709e−001   A4 = −6.87536e−007   A6 = −2.74594e−007
     A8 = −3.34517e−009  A10 = 5.46744e−011 r17  K = −3.19546e−001   A4 = −3.44312e−005   A6 = −5.38007e−007
     A8 = 3.09698e−009 r23  K = −1.71905e+000   A4 = −3.34666e−005   A6 = 2.77369e−006
     A8 = −2.66243e−007   A10 = 9.10758e−009 r25  K = −9.90052e−002   A4 = 1.19499e−005   A6 = 3.10778e−007
     A8 = −6.88274e−009   A10 = 7.59089e−011

Various Data

| | | | |
|---|---|---|---|
| Zoom ratio | | 5.99 | |

| | Wide-angle end | Middle zoom position | Telephoto end |
|---|---|---|---|
| Focal Length            | 7.01   | 20.03   | 42.04  |
| F-number                | 3.10   | 3.90    | 4.31   |
| Angle of View           | 28.9   | 11.0    | 5.27   |
| Image Height            | 3.88   | 3.88    | 3.88   |
| Lens Total Length       | 88.05  | 88.03   | 88.05  |
| BF                      | 1.11   | 1.11    | 1.11   |
| d1                      | 2.97   | 2.97    | 2.96   |
| d6                      | 0.60   | 6.72    | 10.65  |
| d12                     | 10.34  | 4.22    | 0.30   |
| d14                     | 14.11  | 4.62    | 1.80   |
| d24                     | 12.69  | 20.48   | 25.17  |
| d27                     | 4.59   | 6.28    | 4.41   |
| Entrance pupil position | 23.96  | 48.86   | 85.75  |
| Exit pupil position     | −54.79 | −283.95 | 396.05 |
| Front principal point position | 30.09 | 67.49 | 132.26 |
| Rear principal point position  | −5.90 | −18.93 | −40.92 |

Data of Each Zoom Lens Unit

| Lens unit | 1st surface | Focal length | Lens configuration length | Front principal point position | Rear principal point position |
|---|---|---|---|---|---|
| 1  | 1  | 26.69  | 8.89  | 2.24  | −3.13 |
| 2  | 7  | −7.83  | 7.30  | 0.68  | −5.01 |
| pr | 13 | ∞      | 8.50  | 2.32  | −2.32 |
| 3  | 15 | 20.54  | 10.65 | 2.64  | −8.27 |
| 4  | 25 | 30.75  | 4.60  | −0.36 | −3.03 |
| 5  | 28 | 222.73 | 1.71  | 0.00  | −1.27 |

Single Lens Data

| Lens | 1st surface | Focal length |
|------|-------------|--------------|
| 1  | 2  | −54.30  |
| 2  | 3  | 35.16   |
| 3  | 5  | 34.66   |
| 4  | 7  | −10.49  |
| 5  | 9  | −11.08  |
| 6  | 11 | 17.82   |
| 7  | 13 | 0.00    |
| 8  | 17 | 10.62   |
| 9  | 20 | −8.89   |
| 10 | 23 | 18.93   |
| 11 | 25 | 14.04   |
| 12 | 26 | −23.56  |
| 13 | 28 | 222.73  |
| 14 | 31 | 0.00    |

Numerical Example 5

Surface data

| Surface No. | r | d | nd | vd | Effective diameter |
|---|---|---|---|---|---|
| 1 | 47.940 | 1.20 | 1.84666 | 23.8 | 27.53 |
| 2 | 23.137 | 5.05 | 1.59240 | 68.3 | 26.35 |
| 3 | −259.356 | 0.05 | | | 26.23 |
| 4 | 21.007 | 4.05 | 1.77250 | 49.6 | 24.57 |
| 5 | 87.358 | Variable | | | 23.84 |
| 6 | 71.299 | 0.70 | 1.88300 | 40.8 | 14.62 |
| 7 | 8.213 | 3.67 | | | 11.31 |
| 8 | −14.347 | 0.70 | 1.88300 | 40.8 | 11.07 |
| 9 | 23.448 | 0.05 | | | 11.11 |
| 10* | 16.390 | 1.95 | 2.14352 | 17.8 | 11.27 |
| 11 | 723.372 | Variable | | | 11.14 |
| 12 | ∞ | 8.50 | 1.83400 | 37.2 | 8.27 |
| 13 | ∞ | Variable | | | 7.18 |
| 14 | 100.000 | 1.00 | 1.83400 | 37.2 | 7.49 |
| 15 | 39.837 | 2.93 | | | 7.65 |
| 16* | 8.475 | 2.80 | 1.65100 | 56.2 | 8.07 |
| 17 | −199.396 | 1.04 | | | 7.94 |
| 18 | 24.325 | 0.70 | 1.80610 | 33.3 | 7.73 |
| 19 | 8.059 | 0.62 | | | 7.43 |
| 20* | 23.985 | 1.98 | 1.49700 | 81.6 | 7.43 |
| 21 | −24.828 | Variable | | | 7.69 |
| 22* | 13.596 | 2.67 | 1.51633 | 64.1 | 10.01 |
| 23 | −38.595 | 0.60 | 1.84666 | 23.8 | 9.76 |
| 24 | 1059.708 | Variable | | | 9.66 |
| 25 | ∞ | 0.31 | 1.54427 | 70.6 | 20.94 |
| 26 | ∞ | 0.50 | 1.49400 | 75.0 | 20.94 |
| 27 | ∞ | 0.40 | | | 20.94 |
| 28 | ∞ | 0.50 | 1.49831 | 65.1 | 20.94 |
| 29 | ∞ | 0.22 | | | 20.94 |
| Image Plane | ∞ | | | | |

Aspheric Coefficients r10  K = −8.67091e−001  A4 = −2.07518e−005  A6 = 1.42567e−007
    A8 = −2.52900e−008  A10 = 3.48108e−010 r16  K = −4.48898e−001  A4 = −7.59908e−005  A6 = −2.63291e−007
    A8 = −8.45311e−009 r20  K = 4.22377e−001  A4 = 3.44407e−006  A6 = 2.43684e−007
    A8 = 5.78953e−008 r22  K = 1.22038e−001  A4 = −1.60158e−006  A6 = 2.33052e−006
    A8 = −9.37529e−008  A10 = 1.44928e−009

Various Data

Zoom ratio 7.67

| | Wide-angle end | Middle zoom position | Telephoto end |
|---|---|---|---|
| Focal Length | 7.00 | 20.15 | 53.74 |
| F-number | 3.11 | 3.71 | 4.44 |
| Angle of View | 29.0 | 10.9 | 4.13 |
| Image Height | 3.88 | 3.88 | 3.88 |
| Lens Total Length | 88.44 | 88.38 | 88.38 |
| BF | 0.22 | 0.22 | 0.22 |
| d5 | 0.60 | 7.26 | 11.71 |
| d11 | 11.42 | 4.73 | 0.30 |
| d13 | 13.03 | 5.45 | 2.80 |
| d21 | 13.55 | 19.47 | 28.93 |
| d24 | 7.66 | 9.28 | 2.45 |
| Entrance pupil position | 22.83 | 53.24 | 107.11 |
| Exit pupil position | −50.33 | −94.79 | −1825.34 |
| Front principal point position | 28.86 | 69.12 | 159.27 |
| Rear principal point position | −6.79 | −19.93 | −53.52 |

Data of Each Zoom Lens Unit

| Lens unit | 1st surface | Focal length | Lens configuration length | Front principal point position | Rear principal point position |
|---|---|---|---|---|---|
| 1 | 1 | 27.10 | 10.35 | 2.53 | −3.66 |
| 2 | 6 | −7.48 | 7.07 | 1.13 | −4.04 |
| pr | 12 | ∞ | 8.50 | 2.32 | −2.32 |
| 3 | 14 | 20.58 | 11.07 | 3.52 | −5.08 |
| 4 | 22 | 34.18 | 3.27 | −0.57 | −2.62 |
| | 25 | ∞ | 1.71 | 0.63 | −0.63 |

Single Lens Data

| Lens | 1st surface | Focal length |
|---|---|---|
| 1 | 1 | −54.02 |
| 2 | 2 | 36.10 |
| 3 | 4 | 34.88 |
| 4 | 6 | −10.57 |
| 5 | 8 | −9.99 |
| 6 | 10 | 14.64 |
| 7 | 12 | 0.00 |
| 8 | 14 | −80.00 |
| 9 | 16 | 12.55 |
| 10 | 18 | −15.24 |
| 11 | 20 | 24.88 |
| 12 | 22 | 19.82 |
| 13 | 23 | −43.97 |
| 14 | 25 | 0.00 |
| 15 | 26 | 0.00 |
| 16 | 28 | 0.00 |

TABLE 1

| Numerical Example | Condition | | | | | |
|---|---|---|---|---|---|---|
| | (1) | (2) | (3) | (4) | (5) | (6) |
| 1 | 1.87 | 0.62 | 1.55 | 2.71 | 0.91 | 0.91 |
| 2 | 1.51 | 0.79 | 1.79 | 3.00 | 1.02 | 0.93 |
| 3 | 1.84 | 0.49 | 0.54 | 3.00 | 1.04 | 0.76 |
| 4 | 1.43 | 0.80 | 1.62 | 2.93 | 0.92 | 0.95 |
| 5 | 2.03 | 0.36 | 1.76 | 2.94 | 0.82 | 1.02 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-210404 filed Aug. 19, 2008, which is hereby incorporated by reference herein in its entirety.

What is claimed is:

1. A zoom lens comprising, in order from an object side to an image side:
   a first lens unit having a positive refractive power;
   a second lens unit having a negative refractive power;
   a reflection member configured to bend an optical path;
   a third lens unit having a positive refractive power; and
   a fourth lens unit having a positive refractive power,
   wherein during zooming from a wide-angle end to a telephoto end, two or more lens units among the first through the third lens units move and a distance between the second and the third lens units decreases, and wherein the third lens unit includes a first lens sub-unit, and a second lens sub-unit configured to move in a direction having a component perpendicular to an optical axis to displace an image forming position, wherein a lateral magnification of the second lens sub-unit when focusing on an infinitely-distant object at the telephoto end (β3b), an overall lateral magnification of a lens section located closer to the image side than the second lens sub-unit (βr), a distance from a lens surface of the third lens unit closest to the object side to a lens surface of the second lens sub-unit closest to the object side (L3is), and a thickness of the third lens unit in the direction of the optical axis (DL3) satisfy the following conditions:

$$1<(1-\beta 3b)\beta r<3$$

$$0.3<L3is/DL3<0.99.$$

2. The zoom lens according to claim 1, wherein an overall focal length of the lens section located closer to the image side than the second lens sub-unit when focusing on an infinitely-distant object at the telephoto end (fr), a focal length of the entire zoom lens at the wide-angle end (fw), and a focal length of the entire zoom lens at the telephoto end (ft) satisfy the following condition:

$$0.1<|fr/\sqrt{fw \cdot ft}|<3.0.$$

3. The zoom lens according to claim 1, wherein the second lens sub-unit has a positive refractive power and includes one or more aspheric surfaces.

4. The zoom lens according to claim 1, wherein a focal length of the third lens unit L3 (f3) and a focal length of the entire zoom lens at the wide-angle end (fw) satisfy the following condition:

$$1.5<f3/fw<3.2.$$

5. The zoom lens according to claim 1, wherein a focal length of the second lens sub-unit (f3b) and a focal length of the third lens unit L3 (f3) satisfy the following condition:

$$0.5<f3b/f3<1.5.$$

6. The zoom lens according to claim 1, wherein the reflection member includes a reflection surface configured to reflect a ray on the optical axis by 90 degrees relative to a direction of incidence of the ray, and wherein an effective diameter of a lens surface of the second lens unit on the image side (Φ2r), a thickness of the reflection member in the direction of the optical axis (Lp), and a distance from an exit surface of the reflection member to a lens surface of the third lens unit closest to the object side at the telephoto end (Lp3) satisfy the following condition:

$$0.7<(Lp+Lp3)/\Phi 2r<1.5.$$

7. The zoom lens according to claim 1, further comprising a fifth lens unit having a positive refractive power on the image side of the fourth lens unit.

8. The zoom lens according to claim 1, wherein the third lens unit further includes a third lens sub-unit on the image side of the second lens sub-unit.

9. An image pickup apparatus comprising:
the zoom lens according to claim 1; and
a solid-state image sensor configured to receive an image formed by the zoom lens.

10. A zoom lens comprising, in order from an object side to an image side:
a first lens unit having a positive refractive power;
a second lens unit having a negative refractive power;
a reflection member configured to bend an optical path;
a third lens unit having a positive refractive power; and
a fourth lens unit having a positive refractive power,
wherein during zooming from a wide-angle end to a telephoto end, two or more lens units among the first through the third lens units move and a distance between the second and the third lens units decreases, and
wherein the third lens unit includes a first lens sub-unit, and a second lens sub-unit configured to move in a direction having a component perpendicular to an optical axis to displace an image forming position,
wherein the second lens sub-unit has a positive refractive power and includes one or more aspheric surfaces.

11. A zoom lens comprising, in order from an object side to an image side:
a first lens unit having a positive refractive power;
a second lens unit having a negative refractive power;
a reflection member configured to bend an optical path;
a third lens unit having a positive refractive power; and
a fourth lens unit having a positive refractive power,
wherein during zooming from a wide-angle end to a telephoto end, two or more lens units among the first through the third lens units move and a distance between the second and the third lens units decreases, and
wherein the third lens unit includes a first lens sub-unit, and a second lens sub-unit configured to move in a direction having a component perpendicular to an optical axis to displace an image forming position,
wherein a focal length of the third lens unit L3 (f3) and a focal length of the entire zoom lens at the wide-angle end (fw) satisfy the following condition:

$$1.5<f3/fw<3.2.$$

12. A zoom lens comprising, in order from an object side to an image side:
a first lens unit having a positive refractive power;
a second lens unit having a negative refractive power;
a reflection member configured to bend an optical path;
a third lens unit having a positive refractive power; and
a fourth lens unit having a positive refractive power,
wherein during zooming from a wide-angle end to a telephoto end, two or more lens units among the first through the third lens units move and a distance between the second and the third lens units decreases, and
wherein the third lens unit includes a first lens sub-unit, and a second lens sub-unit configured to move in a direction having a component perpendicular to an optical axis to displace an image forming position,
wherein a focal length of the second lens sub-unit (f3b) and a focal length of the third lens unit L3 (f3) satisfy the following condition:

$$0.5<f3b/f3<1.5.$$

13. A zoom lens comprising, in order from an object side to an image side:
a first lens unit having a positive refractive power;
a second lens unit having a negative refractive power;
a reflection member configured to bend an optical path;
a third lens unit having a positive refractive power; and
a fourth lens unit having a positive refractive power,
wherein during zooming from a wide-angle end to a telephoto end, two or more lens units among the first through the third lens units move and a distance between the second and the third lens units decreases, and
wherein the third lens unit includes a first lens sub-unit, and a second lens sub-unit configured to move in a direction having a component perpendicular to an optical axis to displace an image forming position, wherein the reflection member includes a reflection surface configured to reflect a ray on the optical axis by 90 degrees relative to a direction of incidence of the ray, and wherein an effective diameter of a lens surface of the second lens unit on the image side ($\Phi 2r$), a thickness of the reflection member in the direction of the optical axis ($Lp$), and a distance from an exit surface of the reflection member to a lens surface of the third lens unit closest to the object side at the telephoto end ($Lp3$) satisfy the following condition:

$0.7<(Lp+Lp3)/\Phi 2r<1.5.$

14. A zoom lens comprising, in order from an object side to an image side:

a first lens unit having a positive refractive power;
a second lens unit having a negative refractive power;
a reflection member configured to bend an optical path;
a third lens unit having a positive refractive power;
a fourth lens unit having a positive refractive power; and
a fifth lens unit;
wherein during zooming from a wide-angle end to a telephoto end, two or more lens units among the first through the third lens units move and a distance between the second and the third lens units decreases, wherein the third lens unit includes a first lens sub-unit, and a second lens sub-unit configured to move in a direction having a component perpendicular to an optical axis to displace an image forming position, and wherein the fifth lens unit has a positive refractive power on the image side of the fourth lens unit.

15. A zoom lens comprising, in order from an object side to an image side:

a first lens unit having a positive refractive power;
a second lens unit having a negative refractive power;
a reflection member configured to bend an optical path;
a third lens unit having a positive refractive power; and
a fourth lens unit having a positive refractive power,
wherein during zooming from a wide-angle end to a telephoto end, two or more lens units among the first through the third lens units move and a distance between the second and the third lens units decreases, and wherein the third lens unit includes a first lens sub-unit, and a second lens sub-unit configured to move in a direction having a component perpendicular to an optical axis to displace an image forming position, wherein the third lens unit further includes a third lens sub-unit on the image side of the second lens sub-unit.

* * * * *